(12) United States Patent
Kitahara et al.

(10) Patent No.: US 8,137,812 B2
(45) Date of Patent: Mar. 20, 2012

(54) FLUOROPOLYMER AND COMPOSITION THEREOF

(75) Inventors: Takahiro Kitahara, Settsu (JP); Tomohiro Kino, Settsu (JP); Megumi Sato, Settsu (JP); Eiji Fujita, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 798 days.

(21) Appl. No.: 12/176,225

(22) Filed: Jul. 18, 2008

(65) Prior Publication Data

US 2008/0281065 A1 Nov. 13, 2008

Related U.S. Application Data

(62) Division of application No. 10/540,549, filed as application No. PCT/JP2003/016524 on Dec. 24, 2003.

(30) Foreign Application Priority Data

Dec. 25, 2002 (JP) .................................. 2002-375098

(51) Int. Cl.
*B32B 27/28* (2006.01)

(52) U.S. Cl. ....... 428/421; 428/36.9; 428/327; 428/422; 428/522; 526/242; 526/544

(58) Field of Classification Search .................. 428/421, 428/327, 36.9, 422, 522; 526/544, 242
See application file for complete search history.

(56) References Cited

U.S. PATENT DOCUMENTS

| | | | |
|---|---|---|---|
| 4,626,587 A | 12/1986 | Morgan et al. | |
| 5,237,049 A * | 8/1993 | Cavanaugh et al. | 528/491 |
| 6,528,145 B1 * | 3/2003 | Berger et al. | 428/156 |
| 6,680,124 B1 * | 1/2004 | Araki et al. | 428/421 |
| 6,893,729 B2 | 5/2005 | Inaba et al. | |
| 6,900,267 B2 * | 5/2005 | Royer et al. | 525/64 |

FOREIGN PATENT DOCUMENTS

| | | |
|---|---|---|
| EP | 0 150 953 A2 | 8/1985 |
| EP | 150953 A2 * | 8/1985 |
| EP | 0 472 908 A2 | 3/1992 |
| EP | 472908 A2 * | 3/1992 |
| EP | 0969022 A1 | 1/2000 |
| JP | 60-171110 | 9/1985 |
| JP | 4-85305 | 3/1992 |
| JP | 5-8353 | 1/1993 |
| JP | 06-080733 * | 3/1994 |
| JP | 6-80733 | 3/1994 |
| JP | 7-53823 | 2/1995 |
| JP | 8-500628 | 1/1996 |
| JP | 11-160552 | 6/1999 |
| WO | 94/05706 A2 | 3/1994 |
| WO | WO-94/05706 * | 3/1994 |
| WO | 99/45044 A1 | 9/1999 |
| WO | 01/60606 | 8/2001 |
| WO | 02/088207 A1 | 11/2002 |
| WO | 2004/058833 A1 | 7/2004 |
| WO | WO-2004-058833 A * | 7/2004 |

* cited by examiner

*Primary Examiner* — Peter D. Mulcahy
*Assistant Examiner* — Henry Hu
(74) *Attorney, Agent, or Firm* — Sughrue Mion, PLLC

(57) ABSTRACT

The present invention provides a fluoropolymer capable of giving fluorine-containing molded materials and laminates excellent in moldability, productivity, interlaminar bonding and stress cracking resistance, in particular stress cracking resistance upon contacting with various liquid chemicals, without impairing such characteristics intrinsic in fluororesins as chemical resistance, solvent resistance, weathering resistance, antifouling properties, liquid chemical impermeability and nonstickiness. The present invention provides a fluoropolymer which is an oligomer-containing or oligomer-free fluoropolymer, wherein said oligomer has a molecular weight not higher than 10,000 and amounts to not more than 0.05% by mass relative to the fluoropolymer.

2 Claims, No Drawings

FLUOROPOLYMER AND COMPOSITION THEREOF

CROSS-REFERENCE TO RELATED APPLICATION

This is a Divisional of application Ser. No. 10/540,549 filed Jun. 24, 2005, which is a 371 of PCT Application No. PCT/JP2003/016524 filed Dec. 24, 2003. The above-noted applications are incorporated herein by reference in their entirety.

TECHNICAL FIELD

The present invention relates to a fluoropolymer as well as a fluorine-containing molded material, a laminate and a fluorine-containing fabricated article, each comprising the fluoropolymer.

BACKGROUND ART

Fluororesins are excellent in such characteristics as heat resistance, oil resistance, chemical resistance, mold release characteristics, lubricating properties and liquid chemical impermeability. However, fluororesins are expensive and are inferior in moldability, workability, mechanical characteristics and creep characteristics, among others. To solve these problems, resin laminates comprising a fluororesin layer and a non-fluororesin material layer have been proposed.

For example, Japanese Kokai Publication H05-8353 discloses a laminated tube comprising an outer layer made of a polyamide resin and an inside layer made of a fluororesin. This patent document discloses a technology comprising introducing a crosslinking structure between the polymers constituting the polyamide resin layer and fluororesin layer by irradiation with radiation to secure the interlaminar bond strength between both the layers.

However, this technology, which consists in irradiating the surface of the moldings obtained by molding of a fluororesin with radiation and then bonding thereto a polyamide resin layer in the manner of lamination, is complicated in procedure and inferior from the economical viewpoint since it requires an irradiation apparatus.

To solve these problems, a method has been proposed which comprises bonding a fluororesin layer to a non-fluororesin resin material layer in the manner of lamination by coextrusion of both materials to produce a resin laminate such as a multilayer tube.

For example, Japanese Kokai Publication H07-53823 discloses a method of producing three-layer type multilayer tubes having a polyamide resin layer as the outside layer and a fluororesin layer as the inside layer using a multilayer tube coextrusion machine which method comprises using a layer of a resin composition comprising a specific polyamide resin and a specific fluororesin as an intermediate adhesive layer.

However, that method has a problem. Namely, due to the use of a polyamide resin and a fluorine resin, which are poor in mutual compatibility, as the adhesive layer, the morphology of the adhesive layer varies depending on the molding conditions, use temperature and other environmental conditions, so that the cohesive force within the adhesive layer and the bond strength between the adhesive layer and the neighboring layers change accordingly, hence no quality stability can be secured.

To solve this problem, an idea of modifying the fluororesins themselves was conceived, and various cohesive fluororesins have been proposed. For example, the international patent application WO 99/45044 discloses a fluorine-containing ethylenic polymer having a specific carbonate and/or haloformyl group content as a fluororesin capable of being bonded to polyamide resins. However, there is a problem in that even the use of this fluorine-containing ethylenic polymer results in unsatisfactory levels of bond strength.

Meanwhile, in the field of semiconductor manufacture, fluororesins are used as tubes, wafer carriers, and lining materials for containers for high purity liquid chemicals or for storage tanks, among others. In recent years, liquid chemicals supplemented with a surfactant, ozone-containing water and like liquids low in surface energy have been put to use in the field of semiconductor manufacture for the purpose of increasing the detergency. These liquid chemicals are highly penetrative into fluororesins and cause cracking thereof.

Further, when they come into contact with such liquid chemicals as solvents, inorganic acids, alkaline aqueous solutions, gasoline, and ozone-containing water with the stress hung, fluororesins are susceptible to cracking, and this is a matter of concern especially when they are used in the form of piping tubes in automobiles and the like or tubes for transport liquid chemicals, among others.

A method of improving the resistance of fluororesins to such stress cracking (stress cracking resistance), which is in current use, comprises increasing the molecular weight of the tetrafluoroethylene/perfluoro(alkyl vinyl ether) copolymer [PFA], for instance, used in the form of such injection moldings as wafer carriers, joints and nuts in the field of semiconductor manufacture to thereby improve the strength thereof.

However, the stress cracking resistance of fluororesins will not be satisfactorily improved in spite of increases in molecular weight but rather the viscosity thereof becomes very high and the critical shear rate decreases, so that the productivity lowers. Another problem is that moldings obtained by injection molding, among others, show a defective appearance called melt fracture.

Thus, in the art, there are no fluororesins available capable of providing moldings or laminates excellent in moldability, productivity, interlaminar bond strength and stress cracking resistance without impairing such characteristics as chemical resistance, oil resistance, low liquid chemical permeability and heat resistance.

SUMMARY OF THE INVENTION

In view of the above-discussed state of the art, it is an object of the present invention to provide a fluoropolymer capable of giving fluorine-containing molded materials and laminates excellent in moldability, productivity, interlaminar bonding and stress cracking resistance, in particular stress cracking resistance upon contacting with various liquid chemicals, without impairing such characteristics intrinsic in fluororesins as chemical resistance, solvent resistance, weathering resistance, antifouling properties, liquid chemical impermeability and nonstickiness.

Thus, the present invention provides a fluoropolymer which is an oligomer-containing or oligomer-free fluoropolymer, wherein said oligomer has a molecular weight not higher than 10,000 and amounts to not more than 0.05% by mass relative to the fluoropolymer.

The invention also provides a fluoropolymer which is an oligomer-containing or oligomer-free fluoropolymer, wherein said oligomer has a molecular weight not higher than 35,000 and amounts of not more than 0.7% by mass relative to the fluoropolymer.

The invention further provides a fluoropolymer composition comprising the above-defined fluoropolymer and an electrically conductive filler, which gives an extruded strand showing a surface resistance value of not higher than $10^9$ $\Omega \cdot cm/cm$ when charged into a melt indexer.

The invention further provides a fluorine-containing molded material which is made from the above-defined fluoropolymer or fluoropolymer composition.

The invention further provides a method of using fluorine-containing molded material, wherein said fluorine-containing molded material is used in contact with a liquid.

The invention further provides a laminate which comprises the above-defined fluorine-containing molded material and an other layer, wherein said other layer is made from an organic material, metallic material and/or vitreous material.

The invention further provides a fluorine-containing fabricated article made with the above-defined fluorine-containing molded material or the above-defined laminate, said fluorine-containing fabricated article is a film, sheet, hose or tube.

In the following, the present invention is described in detail.

DETAILED DISCLOSURE OF THE INVENTION

The fluoropolymer according to the invention is an oligomer-containing or oligomer-free one. The term "oligomer" as used herein includes oligomers comprising the same monomer or monomers as that/those constituting the fluoropolymer. The fluoropolymer of the invention contains or does not contain those oligomers which have a molecular weight of not higher than 10,000. The fluoropolymer of the invention is also one containing or not containing those oligomers which have a molecular weight of not higher than 35,000. Such oligomers are low-molecular-weight byproducts formed during the polymerization reaction for obtaining the fluoropolymer. By saying "the fluoropolymer contains oligomers" herein, it is meant that the fluoropolymer as an aggregate of fluoropolymer molecules contains molecules of the above-mentioned oligomers together with fluoropolymer molecules. Hereinafter, unless otherwise specified, the term "fluoropolymer" as used herein means an aggregate of the fluoropolymer molecules which may contain the above-mentioned oligomer molecules.

The fluoropolymer of the invention is preferably a fluorine-containing cohesive ethylenic polymer. While, hereinafter, in some cases, the "fluorine-containing cohesive ethylenic polymer" is specifically explained, it is to be construed that the characteristic features of the fluoropolymer of the invention include those explained hereinbelow about the fluorine-containing cohesive ethylenic polymer.

The term "fluorine-containing cohesive ethylenic polymer" as used herein means an aggregate of fluorine-containing ethylenic polymer molecules showing affinity and/or reactivity between the fluorine-containing cohesive ethylenic polymer and another organic material different from the fluorine-containing cohesive ethylenic polymer. The "affinity and/or reactivity" may be such property found between the fluorine-containing cohesive ethylenic polymer molecules and the molecules constituting the organic material other than the fluorine-containing cohesive ethylenic polymer. The above-mentioned "organic material different from the fluorine-containing cohesive ethylenic polymer" is herein sometimes referred to as "organic material" for short. The fluorine-containing cohesive ethylenic polymer is particularly suited for bonding to the organic material. The fluorine-containing cohesive ethylenic polymer can form a layer as a fluorine-containing molded material, as mentioned later herein, and can contribute to the interlaminar bond strength between this layer and an other layer made from the organic material. The bonding between the layer of the fluorine-containing cohesive ethylenic polymer and the other layer made from the organic material is substantially a result of bonding of the fluorine-containing cohesive ethylenic polymer to the organic material. For convenience sake, however, such bonding is sometimes referred to herein as bonding between the fluorine-containing cohesive ethylenic polymer and the organic material. The fluorine-containing cohesive ethylenic polymer is very suited for bonding to organic materials, as mentioned above. The use of the polymer in contact with other materials than the organic materials, for example metallic materials and vitreous materials, is not excluded, however.

The content of oligomers having a molecular weight of not higher than 10,000 in the fluoropolymer of the invention, including the fluorine-containing cohesive ethylenic polymer, is preferably not higher than 0.05% by mass relative to the mass of the fluoropolymer. When it exceeds 0.05% by mass, the oligomers precipitate out in a fairly large amount on the surface of the fluoropolymer layer in the step of melt molding, reducing the cohesive energy between that layer and the organic material layer, with the result that the interlaminar bond strength becomes insufficient. The above mass content is preferably not higher than 0.03% by mass, more preferably not higher than 0.02% by mass, relative to the mass of the fluoropolymer.

As is evident from the principle applied herein that the "fluoropolymer" of the invention means an aggregate of molecules, as mentioned above, the mass of the fluoropolymer of the invention is the mass of the aggregate of molecules. For example, when the fluoropolymer of the invention occurs as a dispersion in which particles formed of fluoropolymer molecules are dispersed in a dispersion medium, the mass of the fluoropolymer of the invention is generally equal to the total mass of the particles formed of molecules of the fluoropolymer of the invention and generally can be equal to the mass of the solid matter in the above-mentioned dispersion.

The content of oligomers having a molecular weight of not higher than 35,000 in the fluoropolymer of the invention, for example the fluorine-containing cohesive ethylenic polymer, is preferably not higher than 0.7% by mass relative to the mass of the solid matter in the fluorine-containing cohesive ethylenic polymer. When it exceeds 0.7% by mass, the oligomers precipitate out in a fairly large amount on the surface of the fluorine-containing cohesive ethylenic polymer layer in the step of melt molding, reducing the cohesive energy between that layer and the organic material layer, with the result that the interlaminar bond strength becomes insufficient. It is preferably not higher than 0.5% by mass, more preferably not higher than 0.3% by mass, relative to the mass of the solid matter in the fluorine-containing cohesive ethylenic polymer. From the interlaminar bond strength and stress cracking resistance improvement viewpoint, the fluorine-containing cohesive ethylenic polymer is preferably one not containing the above-mentioned oligomers. However, even when the oligomer content is 0.001% by mass or higher but within the above range, of course, the interlaminar bond strength and stress cracking resistance can be maintained. The oligomer content and molecular weight given herein are values obtained by gel permeation chromatography (GPC) measurements of an extract obtained by using 1,1-dichloro-1-fluoroethane (hereinafter sometimes referred to as "HCFC-141b") as an extracting solvent.

In cases where a fluorine-containing ethylenic polymer is bonded to the above-mentioned organic material, the means known in the art which comprises introducing a functional group showing affinity for and/or reactivity with the organic material molecules into the fluorine-containing ethylenic polymer molecules and introducing a functional group showing affinity for and/or reactivity with the fluorine-containing ethylenic polymer molecules into the organic material, and bonding the fluorine-containing ethylenic polymer to the organic material under melting by heating, when alone applied, cannot always lead to the manifestation of stable and high levels of bond strength. In accordance with the present invention, however, it is possible to stabilize the interlaminar bond strength between the fluorine-containing cohesive ethylenic polymer layer and the organic layer when the content of oligomers having a molecular weight of not higher than 35,000 (hereinafter sometimes referred to as "oligomer (A) content") in the fluoropolymer of the invention, including the fluorine-containing cohesive ethylenic polymer, is within the above-specified range. When the content of oligomers having a molecular weight of not higher than 10,000 in the fluoropolymer of the invention, including the fluorine-containing cohesive ethylenic polymer, is within the above-specified range, the interlaminar bond strength can be further stabilized.

The term "fluorine-containing ethylenic polymer" as used herein means a fluorine atom-containing ethylenic polymer whose oligomer (A) content and oligomer (B) content (hereinafter each content is sometimes generally referred to as "oligomer content") exceed the above-specified respective ranges. Therefore, the fluorine-containing ethylenic polymer so referred to herein does not conceptually include the above-mentioned fluorine-containing cohesive ethylenic polymer.

The method of reducing the oligomer content in the fluorine-containing cohesive ethylenic polymer to a level within the above range in the practice of the invention is not particularly restricted but may comprise one of the methods mentioned below or a combination of two or more of them. (1) The method comprising adjusting the oligomer content by appropriately selecting or adjusting the chain transfer agent species and the level of addition thereof, the polymerization initiator species and the level of addition thereof, the polymerization temperature, the polymerization pressure and other polymerization conditions in that process of producing the fluorine-containing cohesive ethylenic polymer which is to be described later herein, (2) the method comprising removing oligomers by extruding the fluorine-containing ethylenic polymer obtained by polymerization using an extruder having a vent mechanism equipped with a pressure reducing device, (3) the method comprising removing oligomers by heating the pellets obtained using an extruder at a temperature not higher than the melting point of the fluorine-containing cohesive ethylenic polymer, and (4) the method comprising removing oligomers by extraction from the fluorine-containing ethylenic polymer obtained by polymerization using a solvent having affinity for the oligomers with heating in an autoclave or the like.

The solvent having affinity for the oligomers is not particularly restricted but includes, among others, hydrochlorofluoroalkanes, perfluoroalkanes containing 4 to 15 carbon atoms, perfluorocycloalkanes containing 4 to 15 carbon atoms, perfluoroethers, perfluoroamines, hydrofluoroethers, fluoroalcohols, $R^1$—OC(=O)—$(CH_2)_k$—C(=O)OR$^1$ (in which the two $R^1$ groups are the same or different and each represents an alkyl group containing 1 to 10 carbon atoms and k represents an integer of 2 to 6), and methylene chloride.

As the hydrochlorofluoroalkanes, there may be mentioned, for example, $CHCl_2CF_3$, $CH_3CCl_2F$, $CF_3CF_2CCl_2H$, $CF_2ClCF_2CFHCl$ and $CF_2HCF_2CF_2CF_2Cl$. As the perfluoroalkanes containing 4 to 15 carbon atoms, there may be mentioned, for example, $CF_3CF_2CF_2CF_3$, $CF_3CF_2CF_2CF_2CF_3$ and $CF_3CF_2CF_2CF_2CF_3$. As the perfluorocycloalkanes containing 4 to 15 carbon atoms, there may be mentioned, for example, perfluorocyclobutane and the like. As the perfluoroamines, there may be mentioned, for example, $(C_4F_9)_3N$ and $(C_5F_{11})_3N$. As the hydrofluoroethers, there may be mentioned, for example, $C_4F_9OCH_3$ and $C_4F_9OCH_2CH_3$. As the fluoroalcohols, there may be mentioned, for example $CF_3CH_2OH$, $CF_3CF_2CH_2OH$ and $H(CF_2CF_2)_mCH_2OH$ (in which m represents an integer of 1 to 3).

For some fluorine-containing cohesive ethylenic polymer species, (5) the method comprising reducing the proportion of a specific monomer or monomers to be used for copolymerization may also be used as the method of reducing the oligomer content to a level within the above range. Such method is not particularly restricted but, in cases where the fluorine-containing cohesive ethylenic polymer is a copolymer (I), which is to be described later herein, of tetrafluoroethylene, ethylene, hexafluoropropylene and another monomer copolymerizable with these, for instance, there may be mentioned, for example, the method comprising reducing the proportion, in copolymerization, of the above-mentioned copolymerizable monomer so that the oligomer content may fall within the above-mentioned range.

The fluorine-containing cohesive ethylenic polymer is preferably a cohesive site-containing one. The term "cohesive site" as used herein means a site which is a part of the molecular structure of the fluorine-containing cohesive ethylenic polymer and can participate in bonding between the fluorine-containing cohesive ethylenic polymer and the organic material other than the fluorine-containing cohesive ethylenic polymer. The cohesive site so referred to herein makes it possible for the fluorine-containing cohesive ethylenic polymer to have affinity for and/or reactivity with the organic material and actually is a group having affinity for and/or reactive with the functional group or the like which the organic material molecules have. The cohesive site may be any group having such affinity and/or reactivity and conceptually includes not only such a site as generally a functional group but also a group generally termed a bond, for example an ester bond. The group generally termed a bond may occur in a side chain of the fluorine-containing cohesive ethylenic polymer or in the main chain thereof.

The number of cohesive sites is preferably 3 to 800 sites per $1 \times 10^6$ main chain carbon atoms in the fluorine-containing cohesive ethylenic polymer. When it is lower than 3 sites per $1 \times 10^6$ main chain carbon atoms in the fluorine-containing cohesive ethylenic polymer, poor bonding may result in some instances and, when it exceeds 800 sites, foaming may unfavorably occur in the step of melt molding. A more preferred lower limit is 10 sites, a still more preferred lower limit is 30 sites, and a more preferred upper limit is 500, a still more preferred upper limit is 400 sites, per $1 \times 10^6$ main chain carbon atoms in the fluorine-containing cohesive ethylenic polymer.

The number of cohesive sites as given herein is the value calculated based on the measurement results of infrared spectrum analysis and, unless otherwise specified, it means the number of cohesive sites which the fluorine-containing cohesive ethylenic polymer has prior to the bonding to the organic material, namely prior to lamination, which is to be described later herein. Among the cohesive sites which the fluorine-containing cohesive ethylenic polymer before lamination has, the number of those cohesive sites consumed in the bonding to the organic material is generally very small out of the total number of cohesive sites in the fluorine-containing cohesive ethylenic polymer layer.

The cohesive site is not particularly restricted but may be any site capable of participating in the bonding between the fluorine-containing cohesive ethylenic polymer and the organic material. The cohesive site is preferably carbonyl group, hydroxyl group and/or an amino group. The clause "the cohesive site is preferably carbonyl group, hydroxyl group and/or an amino group" as used herein conceptually includes the case where the cohesive site is a carbonyl group, the case where the cohesive site is a hydroxyl group, and the case where the cohesive site is an amino group. Thus, the cohesive site may be a carbonyl group, a hydroxyl group, or an amino group.

The "carbonyl group" so referred to herein is a carbon-containing divalent group comprising a carbon-oxygen double bond, typically —C(═O). The carbonyl group is not particularly restricted but may be, for example, the partial chemical structure constituting a carbonate group, a haloformyl group, formyl group, a carboxyl group, ester bond [—C(═O)O—], acid anhydride bond [—C(═O)O—C(═O)—], isocyanato group, an amide group, imido group [—C(═O)—NH—C(═O)—], urethane bond [—NH—C(═O)O—], carbamoyl group [NH$_2$—C(═O)—], carbamoyloxy group [NH$_2$—C(═O)O—], ureido group [NH$_2$—C(═O)—NH—], oxamoyl group [NH$_2$—C(═O)—C(═O)—], etc.

The carbonate group is represented by —OC(═O)O—R$^3$ (in which R$^3$ represents an organic group). As the organic group represented by R$^3$ in the above formula, there may be mentioned, for example, an alkyl group containing 1 to 20 carbon atoms, and an ether bond-containing alkyl groups containing 2 to 20 carbon atoms and, among them, an alkyl group containing 1 to 8 carbon atoms and an ether bond-containing alkyl group containing 2 to 4 carbon atoms are preferred. As preferred examples of the carbonate group, there may be mentioned, for example, —OC(═O)OCH$_3$, —OC(═O)OC$_3$H$_7$, —OC(═O)OC$_8$H$_{17}$, and —OC(═O)OCH$_2$CH$_2$CH$_2$OCH$_2$CH$_3$.

The haloformyl group is represented by —COY (Y representing a halogen atom), including —COF and —COCl, for instance.

The amide group is a group represented by the general formula:

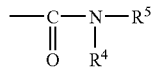

wherein R$^4$ represents hydrogen atom or an organic group, and R$^5$ represents an organic group.

The hydrogen atom or atoms bound to the nitrogen atom in the above-mentioned amino group, amide group, imide group, urethane bond, carbamoyl group, carbamoyloxy group, ureido group, oxamoyl group or the like may each be substituted by a hydrocarbon group such as an alkyl group.

From the adhesion viewpoint, the carbonyl group is preferably one derived from at least one species selected from the class consisting of formyl group, carboxyl group, a haloformyl group, ester bond, acid anhydride bond, a carbonate group, isocyanato group, an amide group, imide group, urethane bond and ureido group. The phrase "derived from at least one species selected from the class" as used herein means that the group in question is a part of the chemical structure of at least one species selected from the functional groups or bonds constituting the above class.

The fluorine-containing cohesive ethylenic polymer may have such a cohesive site as mentioned above either at a main chain terminus or on a side chain, or both at a main chain terminus and on a side chain. When the cohesive site occurs at a main chain terminus, the cohesive site may occur at each main chain terminus or only at one main chain terminus. Preferably, the fluorine-containing cohesive ethylenic polymer has a cohesive site at one or each main chain terminus, since such polymer will not markedly deteriorate the heat resistance, mechanical characteristics or chemical resistance or since such is advantageous from the cost viewpoint.

Even when it contains cohesive site-free, fluorine-containing ethylenic polymer molecules, the fluorine-containing cohesive ethylenic polymer of the invention is only required to have cohesive sites the total number of which per 1×10$^6$ main chain carbon atoms as an aggregate of fluorine-containing ethylenic polymer molecules falls within the above-specified range.

The fluorine-containing cohesive ethylenic polymer preferably has a melting point of 120 to 320° C. and a glass transition temperature of 50 to 200° C. When the melting point and glass transition temperature of the fluorine-containing cohesive ethylenic polymer are within the above respective ranges, the adhesion to those among the organic materials to be mentioned later herein which are poor in heat resistance, in particular, becomes good.

The fluorine-containing cohesive ethylenic polymer is a product of polymerization of at least one fluorine-containing ethylenic monomer and may be a product of polymerization of a fluorine-containing ethylenic monomer and a fluorine-free ethylenic monomer. The fluorine-containing ethylenic monomer and fluorine-free ethylenic monomer each may comprise one single species or two or more species.

The fluorine-containing ethylenic monomer is an ethylenic monomer containing fluorine atom but having no cohesive site, including, among others, tetrafluoroethylene, vinylidene fluoride, trichlorofluoroethylene, chlorotrifluoroethylene, vinyl fluoride, hexafluoroisobutylene, fluoroolefin represented by the general formula (iii):

  (iii)

wherein X$^1$ and X$^2$ are the same or different and each represents hydrogen atom or fluorine atom, X$^3$ represents hydrogen atom, fluorine atom or chlorine atom, and n represents an integer of 1 to 10, and an perfluorovinyl ethers represented by the general formula (ii):

  (ii)

wherein Rf$^2$ represents a perfluoroalkyl group containing 1 to 5 carbon atoms. As the fluoroolefin represented by the general formula (iii), there may be mentioned, for example, hexafluoropropylene and the like.

The above-mentioned fluorine-free ethylenic monomer is an ethylenic monomer having no fluorine atom and no cohesive site and, in view of the absence of possibility of reducing the heat resistance or chemical resistance, among others, of the fluorine-containing cohesive ethylenic polymer obtained, it is preferably an ethylenic monomer containing not more than 5 carbon atoms, for example ethylene, propylene, 1-butene, 2-butene, vinyl chloride, or vinylidene chloride.

As preferred examples of the fluorine-containing cohesive ethylenic polymer of the invention, there may be mentioned the following fluorine-containing cohesive ethylenic polymers (I) to (III) whose main chains respectively comprise a monomer unit given below:
(I) A copolymer comprising at least tetrafluoroethylene unit and ethylene unit;
(II) A copolymers comprising at least tetrafluoroethylene unit and a perfluoro monomer unit derived from a perfluoro monomer represented by the general formula (i):

  (i)

wherein $Rf^1$ represents $CF_3$ or $ORf^2$, and $Rf^2$ represents a perfluoroalkyl group containing 1 to 5 carbon atoms. The perfluoro monomer units may be of one single species or of two or more species.

(III) A copolymer comprising at least vinylidene fluoride unit. The copolymer (I) may be any copolymer comprising at least tetrafluoroethylene unit and ethylene unit and, therefore, it may further comprise a perfluoro monomer unit derived from a perfluoro monomer represented by the general formula (i) and vinylidene fluoride unit and, thus, the copolymer (I) can conceptually include the copolymer (II) and/or copolymer (III). In the same manner, the copolymer (II) can conceptually include the copolymer (I) and/or copolymer (III), and the copolymer (III) can conceptually include the copolymer (I) and/or copolymer (II).

The copolymer (I) is, for example, a polymer having tetrafluoroethylene unit content of not lower than 20 mole percent and, as such, there may be mentioned, for example, a copolymer comprising 20 to 80 mole percent of tetrafluoroethylene unit, 20 to 80 mole percent of ethylene unit and 0 to 60 mole percent of a unit derived form a monomer copolymerizable with them. The "unit" as used herein for a monomer means a part of the molecular structure of the polymer and a portion derived from that monomer. For example, the tetrafluoroethylene unit is represented by —$CF_2$—$CF_2$—. The "mole percent" given herein for each monomer unit species is the proportion of the monomer unit relative to the total number of moles, which is taken as 100 mole percent, of the copolymer molecular chain-constituting monomer units after subtraction of the number of moles of monomer units derived from the cohesive site-containing ethylenic monomer to be mentioned later herein.

As the copolymerizable monomer, there may be mentioned, for example, trichlorofluoroethylene, a fluoroolefin represented by the above general formula (iii), a perfluorovinyl ether represented by the above general formula (ii), and propylene, and one or two or more of these may be used.

The copolymer (I) is excellent in heat resistance, chemical resistance, weathering resistance, electric insulating quality, low liquid chemical permeability and non-stickiness and, further, the melting point thereof can be easily lowered, so that it becomes possible to coextrude it with those among the organic materials to be mentioned later herein which are relatively low in melting point and poor in heat resistance and it becomes favorably possible to obtain laminates with those organic materials with ease.

Preferred as the copolymer (I) is, among others, a copolymer comprising 0 to 60 mole percent as a total of perfluorovinyl ether unit derived from a perfluorovinyl ether represented by the general formula (ii) and/or fluoroolefin unit derived from a fluoroolefin represented by the general formula (iii), 20 to 80 mole percent of tetrafluoroethylene unit and 20 to 80 mole percent of ethylene unit.

As such copolymer, there may be mentioned, for example, the following:
(I-I) A copolymer comprising 30 to 70 mole percent of tetrafluoroethylene unit, 20 to 55 mole percent of ethylene unit and 0 to 10 mole percent of a fluoroolefin unit derived from a fluoroolefin represented by the general formula (iii);
(I-II) A copolymer comprising 30 to 70 mole percent of tetrafluoroethylene unit, 20 to 55 mole percent of ethylene unit, 1 to 30 mole percent of hexafluoropropylene unit and 0 to 10 mole percent of a unit derived from a monomer copolymerizable with these;
(I-III) A copolymer comprising 30 to 70 mole percent of tetrafluoroethylene unit, 20 to 55 mole percent of ethylene unit and 0 to 10 mole percent of a perfluorovinyl ether unit derived from a perfluorovinyl ether represented by the general formula (ii). The copolymerizable monomer in the above copolymer (I-II) does not include hexafluoropropylene.

The units derived from the above-mentioned copolymerizable monomer, which may be a constituent of the copolymer (I), may be contained or not contained in the copolymer (I), including the case where they are perfluorovinyl ether units derived from a perfluorovinyl ether represented by the general formula (ii) and/or fluoroolefin units derived from a fluoroolefin represented by the general formula (iii).

The copolymer (II) is preferably a copolymer comprising tetrafluoroethylene unit and a perfluoro monomer unit derived from a perfluoro monomer represented by the general formula (i). The perfluoro monomer represented by the general formula (i) includes hexafluoropropylene or a perfluorovinyl ether represented by the general formula (ii), as is evident from the definition given for the general formula (i). As preferred examples of the copolymer (II), there may be mentioned the following:
(II-I) A copolymer comprising 65 to 95 mole percent of tetrafluoroethylene unit and 5 to 35 mole percent of hexafluoropropylene unit;
(II-II) A copolymer comprising 70 to 97 mole percent of tetrafluoroethylene unit and 3 to 30 mole percent as a total of a perfluorovinyl ether unit derived from one or two or more perfluorovinyl ethers represented by the general formula (ii);
(II-III) A copolymer comprising 70 to 95 mole percent of tetrafluoroethylene unit and a total of 5 to 30 mole percent of hexafluoropropylene unit and a perfluorovinyl ether unit derived from one or two or more perfluorovinyl ethers represented by the general formula (ii). In the copolymer (II-I), a preferred lower limit to the content of tetrafluoroethylene unit is 75 mole percent, and a preferred upper limit to the content of hexafluoropropylene unit is 25 mole percent.

The copolymer (II) is a perfluoro type copolymer and is particularly excellent in heat resistance, chemical resistance, water repellency, oil repellency, non-stickiness, electric insulating quality and low liquid chemical permeability, among fluororesins, and therefore is judiciously used. The "perfluoro type copolymer" so referred to herein is a polymer comprising only tetrafluoroethylene unit and/or a perfluoro monomer unit derived from a perfluoro monomer represented by the general formula (i), if desired together with a monomer unit derived from a cohesive site-containing ethylenic monomer to be mentioned later herein.

As the copolymer (III), there may be mentioned a polymer having a vinylidene fluoride unit content of not lower than 10 mole percent. Preferred as such polymer is, for example, a copolymer comprising 15 to 100 mole percent of vinylidene fluoride unit, 0 to 80 mole percent of tetrafluoroethylene unit and 0 to 30 mole percent as a total of hexafluoropropylene unit and/or trichlorofluoroethylene unit.

As the copolymer (III), there may be mentioned, for example, the following:
(III-I) A vinylidene fluoride homopolymer;
(III-II) A copolymer comprising 30 to 99 mole percent of vinylidene fluoride unit and 1 to 70 mole percent of tetrafluoroethylene unit;
(III-III) A copolymer comprising 10 to 90 mole percent of vinylidene fluoride unit, 0 to 90 mole percent of tetrafluoroethylene unit and 1 to 30 mole percent of trichlorofluoroethylene unit;
(III-IV) A copolymer comprising 10 to 90 mole percent of vinylidene fluoride unit, 0 to 90 mole percent of tetrafluoroethylene unit and 0 to 30 mole percent of hexafluoropropylene unit.

A copolymer comprising 15 to 84 mole percent of vinylidene fluoride unit, 15 to 84 mole percent of tetrafluoroethylene unit and 0 to 30 mole percent of hexafluoropropylene unit preferred as the above-mentioned copolymer (III-IV).

Among the tetrafluoroethylene, hexafluoropropylene and trichlorofluoroethylene unit, which may constitute the copolymer (III), those which may amount to 0 (zero) mole percent in various species of the copolymer (III) may be contained or not contained in the copolymer (III).

The above-mentioned copolymer (III) is a copolymer having a relatively low melting point and has a high level of affinity for highly polar, fluorine-free thermoplastic resins and therefore shows excellent adhesion to those highly polar, fluorine-free thermoplastic resins even when the cohesive site content in the copolymer (III) is low. The term "fluorine-free thermoplastic resins" as used herein means that the thermoplastic resin-constituting polymers have no fluorine atom.

The above-mentioned fluorine-containing cohesive ethylenic polymer may have a cohesive site or sites at a main chain terminus or termini or on a side chain or side chains, as mentioned hereinabove. When it has cohesive sites on side chains, the fluorine-containing cohesive ethylenic polymer can be obtained by copolymerizing a cohesive site-containing ethylenic monomer with a fluorine-containing ethylenic monomer and/or a fluorine-free ethylenic monomer selected and formulated according to the desired fluorine-containing cohesive ethylenic polymer. The fluorine-containing cohesive ethylenic polymer having cohesive sites on side chains can also be obtained by graft polymerization. The term "cohesive site-containing ethylenic monomer" means an ethylenic monomer having at least one cohesive site and containing one or more fluorine atoms or containing no fluorine atom. However, the term does not conceptually include the above-mentioned "fluorine-containing ethylenic monomer" and "fluorine-free ethylenic monomer".

Preferred as the cohesive site-containing ethylenic monomer is an ethylenic monomer having at least one cohesive site and represented by the general formula (iv):

$$CX^4{}_2=CX^5-(Rf^3)_n-Z \quad (iv)$$

wherein Z represents hydroxyl, carbonyl, epoxy or sulfonic acid group-containing functional group, $X^4$ and $X^5$ are the same or different and each represents hydrogen atom or fluorine atom, $Rf^3$ represents a fluorine-containing alkylene group containing 1 to 40 carbon atoms, which may optionally contain at least one ether bond or an alkylene group containing 1 to 40 carbon atoms, which may optionally contain at least one ether bond, and n represents an integer of 0 or 1.

The cohesive site-containing ethylenic monomer may be an unsaturated dicarboxylic acid monoester, vinylene carbonate, maleic anhydride, or maleic acid, for instance.

For obtaining fluorine-containing cohesive ethylenic polymers having a cohesive site or sites at a main chain terminus or termini, various methods can be used. In cases where the cohesive site has carbonyl group and/or hydroxyl group, for instance, the method comprising using a polymerization initiator having carbonyl group and/or hydroxyl group or a functional group capable of being converted to carbonyl or hydroxyl group, for example a peroxycarbonate, peroxy ester or peroxy alcohol, to thereby introduce the peroxide-derived carbonyl group and/or hydroxyl group into the main chain terminus or termini can be preferably used because of the ease of realizing and controlling the carbonyl group and/or hydroxyl group introduction and from the economical viewpoint and in view of the heat resistance, chemical resistance and other quality features.

When the above method is used, a peroxide-derived carbonyl group and/or hydroxyl group, for example a peroxycarbonate-derived carbonate group, a peroxy ester-derived ester bond, or a peroxy alcohol-derived hydroxyl group, can be introduced into the main chain terminus or termini of the fluorine-containing cohesive ethylenic polymer. When the above method is used, it is also possible to convert the peroxycarbonate-derived carbonate group or the peroxy ester-derived ester bond, for instance, to thereby introduce carboxyl group or a haloformyl group, for instance, into the main chain terminus or termini of the fluorine-containing cohesive ethylenic polymer. When a peroxy carbonates is used among those polymerization initiators, the polymerization temperature can be lowered and the initiation reaction will not be accompanied by any side reaction, hence a peroxy carbonate is particularly preferred as the above-mentioned polymerization initiator. The expression "peroxide-derived" means that the group in question is a result of direct introduction of the functional group contained in the peroxide or a result of indirect introduction by conversion of the functional group directly introduced from the functional group contained in the peroxide.

While the level of addition of the polymerization initiator is to be appropriately selected according to the species, composition and molecular weight of the desired fluorine-containing cohesive ethylenic polymer, the polymerization conditions and the polymerization initiator species employed, the addition level is preferably 0.05 to 20 parts by mass relative to 100 parts by mass of the fluorine-containing cohesive ethylenic polymer to be obtained by polymerization. A particularly preferred lower limit is 0.1 parts by mass, and a particularly preferred upper limit is 5 parts by mass.

The method of polymerization for producing the fluorine-containing cohesive ethylenic polymer in the practice of the invention is not particularly restricted but mention may be made of solution polymerization, emulsion polymerization and bulk polymerization, among others. From the industrial viewpoint, suspension polymerization in an aqueous medium using a fluorine-containing solvent and a peroxycarbonate or the like as the polymerization initiator is preferred. In such suspension polymerization, the fluorine-containing solvent can be used in admixture with water.

As the fluorine-containing solvent to be used in suspension polymerization, there may be mentioned, for example, a hydrochlorofluoroalkane, a perfluoroalkane, and a perfluorocycloalkane. As the hydrochlorofluoroalkane, there may be mentioned, among others, $CH_3CClF_2$, $CH_3CCl_2F$, $CF_3CF_2CCl_2H$, and $CF_2ClCF_2CFHCl$. As the perfluoroalkane, there may be mentioned, for example, $CF_3CF_2CF_2CF_3$, $CF_3CF_2CF_2CF_2CF_3$ and $CF_3CF_2CF_2CF_2CF_2CF_3$. As the perfluorocycloalkane, there may be mentioned perfluorocyclobutane and the like. Among them, a perfluoroalkane is preferred.

The polymerization temperature is not particularly restricted but may be 0 to 100° C. The polymerization pressure is to be appropriately selected according to the species, amount and vapor pressure of the solvent employed, the polymerization temperature and other polymerization conditions except for the polymerization pressure. Generally, however, it may be 0 to 9.8 MPaG.

In the polymerization to produce the fluorine-containing cohesive ethylenic polymer, a chain transfer agent in general use, for example a hydrocarbon such as isopentane, n-pentane, n-hexane or cyclohexane; an alcohol such as methanol or ethanol; or a halogenated hydrocarbon such as carbon tetrachloride, chloroform, methylene chloride or methyl chloride, can be used for molecular weight adjustment.

By adjusting the polymerization initiator addition level, chain transfer agent addition level, polymerization temperature and other polymerization conditions, it is possible to control the terminal cohesive site content with ease and, further, as mentioned above, it is also possible to adjust the oligomer content in the fluorine-containing cohesive ethylenic polymer to a level within the range mentioned above.

The melt flow rate [MFR] of the fluorine-containing cohesive ethylenic polymer is not particularly restricted but preferably is 0.1 to 100 (g/10 min) at an arbitrary temperature within the range of 200 to 400° C. When it is less than 0.1 (g/10 min), the melt viscosity of the fluorine-containing cohesive ethylenic polymer will become high, possibly resulting in poor moldability in some instances and, when it exceeds 100 (g/10 min), it becomes difficult in some instances to maintain the stress cracking resistance, in particular the stress cracking resistance in contact with a liquid chemical, of a fluorine-containing molded material (to be mentioned later herein) and the like obtained by using the fluorine-containing cohesive ethylenic polymer. A more preferred lower limit is 1 (g/10 min), and a more preferred upper limit is 50 (g/10 min) and a still more preferred upper limit is 30 (g/10 min). While, generally, when the MFR is excessively high, the stress cracking resistance of the molded material obtained tends to decrease, the above-mentioned fluorine-containing cohesive ethylenic polymer whose oligomer content falls within the range specified above can provide fluorine-containing molded materials or the like sufficiently improved in stress cracking resistance even when the MFR is relatively high, as mentioned above.

The MFR value reported herein is the value obtained by making measurement at an arbitrary temperature in the range of 200 to 400° C. using a melt indexer (product of Toyo Seiki Seisakusho, Ltd.).

The above-mentioned fluorine-containing cohesive ethylenic polymer, which has an oligomer content reduced to a level within the above-specified range, has good adhesive properties and can provide a fluorine-containing molded material, laminate and the like excellent in stress cracking resistance, in particular stress cracking resistance in contact with a liquid chemical, and in chemical resistance, oil resistance, low liquid chemical permeability, heat resistance and other characteristics.

The fluoropolymer composition of the invention is a composition comprising the above-mentioned fluoropolymer. Since the above-mentioned fluorine-containing cohesive ethylenic polymer is preferred as the fluoropolymer of the invention, as described above, a fluorine-containing cohesive ethylenic polymer composition comprising the fluorine-containing cohesive ethylenic polymer is preferred as the fluoropolymer composition of the invention. In the following, the above-mentioned "fluorine-containing cohesive ethylenic polymer composition" is sometimes taken as a typical example in describing the fluoropolymer composition of the invention, and the characteristics of the fluoropolymer composition of the invention include the contents of the description of the fluorine-containing cohesive ethylenic polymer composition in the following.

The fluorine-containing cohesive ethylenic polymer composition mentioned above may be one prepared by using, together with the above-mentioned fluorine-containing cohesive ethylenic polymer, electrically conductive fillers (to be mentioned later herein), other fillers other than the conductive fillers, colorants, and one or more of various additives at respective addition levels at which the accomplishment of the object of the invention will not be hindered. As the additives, there may be mentioned, for example, organic antistatic agents, flame retardants, heat stabilizers, ultraviolet absorbers, lubricants, mold release agents, and nucleating agents. As the other fillers, there may be mentioned, for example, glass fibers, glass beads, carbon fibers, talc, mica, a expansible silicate, wollastonite, clays, calcium carbonate, barium sulfate, potassium titanate, and aluminum oxide. The incorporation of the other filler is preferred since it can still more improve the mechanical characteristics, heat resistance and weathering resistance, among others, of the fluorine-containing molded material, which are mentioned later herein, made from the above fluorine-containing cohesive ethylenic polymer composition.

A composition comprising the above-mentioned fluorine-containing cohesive ethylenic polymer and a conductive filler (hereinafter sometimes referred to as "fluorine-containing cohesive ethylenic polymer-based conductive composition") is preferred as the above fluorine-containing cohesive ethylenic polymer composition. The fluorine-containing cohesive ethylenic polymer-based conductive composition is preferably one which, when charged into a melt indexer, gives an extrudate strand showing a surface resistance value of not higher than $10^9$ Ω·cm/cm. When that value is not higher than $10^9$ Ω·cm/cm, the fluorine-containing molded material (to be mentioned later herein) made from the fluorine-containing cohesive ethylenic polymer-based conductive composition can have such an extent of conductivity that allows no static charge accumulation. This is favorable since there arises no possibility of inflammation even in continuous contact with an inflammable liquid such as gasoline. A preferred lower limit to the surface resistance value is $1\times10^0$ Ω·cm/cm and a more preferred lower limit is $1\times10^2$ Ω·cm/cm, and a more preferred upper limit is $1\times10^8$ Ω·cm/cm.

The "surface resistance value" so referred to herein is the value obtained, as mentioned later herein, by charging the fluorine-containing cohesive ethylenic polymer-based conductive composition into a melt indexer (product of Toyo Seiki), heating the composition in the melt indexer at an arbitrary temperature of 200 to 400° C. and, after extrusion, measuring the thus-obtained extrudate strand for surface resistance using a battery-driven insulation resistance tester (rating: 500 V/100 MΩ; product of Yokogawa Electric Corporation).

As preferred examples of the conductive filler, there may be mentioned, for example, powders of such metals as copper, nickel and silver; fibers of such metals as iron and stainless steel; metallized inorganic compounds obtained by coating the surface of zinc oxide, glass beads, titanium oxide and the like by metal sputtering or nonelectrolytic plating, for instance; and carbon black. Among them, carbon black is preferred in view of its economy and high static charge accumulation preventing effect.

The level of addition of the conductive filler is to be appropriately determined according to the fluorine-containing cohesive ethylenic polymer species, the conductivity level required of the fluorine-containing molded material (to be mentioned later herein) made from the fluorine-containing cohesive ethylenic polymer-based conductive composition, and the molding conditions, among others. Preferably, however, it is 1 to 30 parts by mass relative to 100 parts by mass of the fluorine-containing cohesive ethylenic polymer. At levels lower than 1 part by mass, the conductivity will be insufficient and, at levels exceeding 30 parts by mass, the melt flow rate will lower, resulting in poor moldability, or the fluorine-containing cohesive ethylenic polymer content in the fluorine-containing molded material will unfavorably become so low that the mechanical strength of the fluorine-containing molded material may markedly decrease in some instances. A more preferred lower limit is 5 parts by mass and a more preferred upper limit is 20 parts by mass, relative to 100 parts by mass of the fluorine-containing cohesive ethylenic polymer.

The method for obtaining the fluorine-containing cohesive ethylenic polymer composition is not particularly restricted but mention may be made, for example, of the method comprising melt mixing the conductive filler and the fluorine-containing cohesive ethylenic polymer and pelletizing the resulting mixture. The melt mixing is carried out by mechanical mixing at a temperature at which at least the fluorine-containing cohesive ethylenic polymer melts. The melt mixing can be carried out using a high-temperature kneader, a screw type extruder or the like, for instance. A twin-screw extruder is preferably used among others, since it can mix up the fluorine-containing cohesive ethylenic polymer and conductive filler uniformly.

The fluorine-containing molded material of the invention is made from the above-mentioned fluoropolymer of the invention or the above-mentioned fluoropolymer composition. Since the fluorine-containing cohesive ethylenic polymer is preferred as the fluoropolymer of the invention, a molded material made from the fluorine-containing cohesive ethylenic polymer or fluorine-containing cohesive ethylenic polymer composition is preferred as the fluorine-containing molded material of the invention.

The fluorine-containing molded material is more preferably one whose resin component mainly comprises the above-mentioned fluorine-containing cohesive ethylenic polymer, and it may be one whose resin component comprises the fluorine-containing cohesive ethylenic polymer alone.

The fluorine-containing molded material is preferably one made from the fluorine-containing cohesive ethylenic polymer-based conductive composition according to the intended use thereof. Fluororesins are by nature highly insulating nonconductive materials and, when an inflammable liquid such as gasoline comes into continuous contact with the surface of fluororesin molded material, there arise the possibility of inflammation due to accumulation of static charges. The fluorine-containing molded material, when made from the above-mentioned fluorine-containing cohesive ethylenic polymer-based conductive composition, can have such an extent of conductivity that will not allow such static charge accumulation.

The method of molding the fluorine-containing molded materials of the invention is not particularly restricted but may be any of the molding methods known in the art. For example, there may be mentioned injection molding, extrusion molding, inflation molding, blow molding, powder baking coating molding, and insert molding using a mold etc. When the fluorine-containing molded material is for producing a laminate, which is to be mentioned later herein, it is preferable from the adhesion viewpoint that the laminate be produced by lamination by simultaneous multilayer molding, such as melt coextrusion molding, of the fluorine-containing cohesive ethylenic polymer and an organic material for constituting the other layer, which is to be described later herein.

The method of using the fluorine-containing molded material according to the invention consists in the method of using the fluorine-containing molded material in contact with a liquid. The expression "use in contact with a liquid" as used herein means that the material is brought into contact with a liquid at least at certain points of time during the use thereof. While the "use in contact with a liquid" may be the use in contact with a liquid at certain points of time during the use thereof but not in contact with any liquid at other points of time, the molded material is also suited for use in contact with a liquid during the whole period of use thereof since the above-mentioned fluorine-containing molded material to be used is excellent in stress cracking resistance. The liquid is not particularly restricted but includes, among others, a paint, a drink, a liquid food, a liquid chemical, a fuel, and a crude oil and a crude oil refined product in liquid form, which is to be mentioned later herein.

According to the above-mentioned method of using the fluorine-containing molded material, the fluorine-containing molded material excellent in stress cracking resistance in particular in contact with a liquid chemical is used, so that the occurrence of stress cracking can be prevented even when the fluorine-containing molded material is brought into contact with such a liquid as a liquid chemical. The above-mentioned method of using the fluorine-containing molded material can be applied to a hose and a tube (to be mentioned later herein); a member required to have a high level of chemical resistance, such as a diaphragm of a diaphragm pump and various packing members, a liquid chemical reservoir lining material, a tank inside lining material for a lorrie, and an other film and sheet; a bottle, a container, a tank and the like (to be mentioned later herein).

The fluorine-containing molded material of the invention can be adequately used in contact with a liquid on the occasion of use thereof, and it may be in contact with a liquid not only on the occasion of use but also during the period of nonuse. As the one which can be in contact with a liquid during the nonuse period as well, there may be mentioned one comprising the above-mentioned fluorine-containing molded material and another member, for example one which may possibly come into contact with a liquid such as a liquid chemical as a result of leakage thereof through the other member in a semiconductor apparatus or a like apparatus or in an automobile, for instance. When it is made from the above-mentioned fluorine-containing cohesive ethylenic polymer-based conductive composition, the fluorine-containing molded material will not allow static charge accumulation even when in continuous contact with an inflammable liquid such as gasoline, hence the possibility of inflammation is low.

The laminate of the invention comprises the above-mentioned fluorine-containing molded material and an other layer. In the laminate, the fluorine-containing molded material serves as a layer and is bonded to the other layer. The fluorine-containing molded material as a layer in the laminate is sometimes referred to herein as "layer made from the fluorine-containing molded material" or "fluorine-containing molded material layer". Since the fluorine-containing molded material comprises the fluoropolymer of the invention, as described hereinabove, the fluorine-containing molded material layer is a layer comprising the fluoropolymer of the invention. The fluorine-containing molded material is preferably one comprising the fluorine-containing cohesive ethylenic polymer described above, and the fluorine-containing molded material layer is a layer comprising the fluorine-containing cohesive ethylenic polymer.

The other layer is one made from an organic material, a metallic material and/or an vitreous material. The phrase "one made from an organic material, an metallic material and/or an vitreous material" as used herein means that the layer may be any of the following (1) to (7):

(1) One produced by using an organic material alone but using no metallic material or vitreous material;
(2) One produced by using a metallic material alone but using no organic material or vitreous material;
(3) One produced by using a vitreous material alone but using no organic material or metallic material;

(4) One produced by using an organic material and a metallic material but using no vitreous material;
(5) One produced by using an organic material and a vitreous material but using no metallic material;
(6) One produced by using a metallic material and a vitreous material but using no organic material;
(7) One produced by using an organic material, a metallic material and a vitreous material.

The organic material, metallic material and vitreous material each may comprise one single species or two or more species. From the adhesion viewpoint, the other layer is preferably the above-mentioned (1), (4), (5) or (7) in which an organic material is used.

As the organic material, there may be mentioned, for example, a synthetic resin; a natural organic material such as a natural fiber, a wood, a paper and a leather; and a composite material comprising two or more of these.

The synthetic resin includes, for example, a polyester resin, a polyamide resin, a polyphenylene sulfide resin, an acrylic resin, a vinyl acetate resin, a polyolefin resins, a vinyl chloride resin, a polycarbonate resin, a styrenic resin, an urethane resin, an acrylonitrile/butadiene/styrene [ABS] resin, a polyimide resin, a polyamideimide resin, a polyetheretherketone [PEEK] resin, a polyethersulfone [PES] resin, a polysulfone resin, a polyphenylene oxide [PPO] resin, a polyaramide resin, a polyacetal resin, a polyetherimide resin, a silicone resin, an epoxy resin, a phenol resin, an amino resin, an unsaturated polyester resin, a cellulose derivative resin, a polyvinyl alcohol resin, an ethylene/vinyl alcohol resin, and an modified polyolefin resin.

The synthetic resin is preferably a thermoplastic resin because of its being capable of melt adhesion molding with the fluorine-containing molded material layer, and the thermoplastic resin includes, among others, a polyamide resin, a polyester resin, a polycarbonate resin, a polyamideimide resin, a polyethersulfone [PES] resin, a polysulfone resin, an urethane resin, a polyphenylene oxide [PPO] resin, a polyetherimide resin, a polyacetal resin, a polyvinyl alcohol resin, an ethylene/vinyl alcohol resin, and a modified polyolefin resin.

The term "polyamide resin" as used herein conceptually includes (1) a polyamide resin, (2) a polyamide-based elastomer or (3) a resin alloy comprising a polyamide resin and an other non-polyamide resin.

As the polyamide resin (1), there may be mentioned, for example, a polyamide resin synthesized by the ring opening polymerization reaction of a cyclic aliphatic lactam, the polycondensation reaction of an aliphatic and/or alicyclic diamine and an aliphatic and/or alicyclic dicarboxylic acid, the polycondensation reaction of an aminocarboxylic acid, and the copolymerization reaction of the so-called dimer acid mainly comprising a dicarboxylic acid containing 36 carbon atoms as obtained by dimerization of a unsaturated fatty acid and a short-chain dibasic acid and a diamine. As such polyamide resin, there may be mentioned, for example, nylon 6, nylon 66, nylon 11, nylon 12, nylon 610, nylon 612, nylon 6/66, nylon 66/12, nylon 46, metaxylenediamine/adipic acid polymer, a copolymer of one or two or more of the monomers constituting the above ones and the dimer acid, and blends composed of two or more of these. Among them, nylon 6, nylon 11, nylon 12, nylon 610 and nylon 612 are preferred.

The polyamide resin (1) generally has an average molecular weight of 5,000 to 500,000.

As the polyamide-based elastomer (2), there may be mentioned, for example, a polyetheresteramide elastomer of the ABA block type comprising a polyamide as a crystalline segment and a polyether and/or a polyester as a soft segment, a polyetheramide elastomer, and a polyesteramide elastomer.

Such polyamide-based elastomers are obtained, for example, by the condensation reaction of lauryllactam and dicarboxylic acid and polytetramethylene glycol. The number of carbon atoms in each repeating unit in the hard segment polyamide, the chemical structure and proportion of each repeating unit in the soft segment, and the molecular weight of each block, among others, can be properly designed according to the flexibility, elastic recovery and other desired characteristics of each produce polyamide-based elastomer.

As the resin alloy (3) of a polyamide resin and an other non-polyamide resin, there may be mentioned, for example, the following:

(3-1) Polyamide/polyolefin alloy;
(3-2) Polyamide/ABS alloy:
(3-3) Polyamide/polyphenylene ether alloy;
(3-4) Polyamide/polyarylate alloy.

The above-mentioned ethylene/vinyl alcohol [E-VAL] resin is obtained by the hydrolysis reaction of acetyl groups of ethylene/vinyl acetate copolymer [E-VA]. The content of the hydroxyl groups in the polymers constituting the ethylene/vinyl alcohol resins can be adequately selected through the amount of vinyl acetate subjected to copolymerization and the degree of hydrolysis.

The above-mentioned polyvinyl alcohol resin is obtained, for example, by the method comprising converting the acetyl groups in the polymers constituting the polyvinyl acetate resin to hydroxyl groups by the hydrolysis reaction. In many cases, the properties of the polyvinyl alcohol resin depend on the degree of polymerization and the degree of hydrolysis. Each polyvinyl alcohol resin that can be used in producing the laminate of the invention is not particularly restricted with respect to the degree of polymerization and degree of hydrolysis, however.

The above-mentioned modified polyolefin resin comprises a polymer of an olefin and a polar functional group-containing comonomer. As the modified polyolefin resin, there may be mentioned, for example, a resin comprising an ethylene copolymer obtained by high-pressure polymerization, and a resin comprising an ethylene copolymer obtained by graft copolymerization. As the ethylene copolymer obtained by high pressure polymerization, there may be mentioned, among others, a copolymer obtained by radical copolymerization of ethylene and a polar group-containing comonomer and, as such, there may be mentioned, for example, ethylene/vinyl acetate copolymer, ethylene/vinyl acetate/unsaturated carboxylic acid copolymer, ethylene/ethyl acrylate copolymer, ethylene/methyl methacrylate copolymer, ethylene/acrylic acid copolymer, ethylene/methacrylic acid copolymer, ethylene/maleic anhydride copolymer, ethylene/aminoalkyl methacrylate copolymer, ethylene/vinylsilane copolymer, ethylene/glycidyl methacrylate copolymer, and ethylene/hydroxyethyl methacrylate copolymer.

As the ethylene copolymer obtained by graft copolymerization, there may be mentioned a copolymer obtained by reacting polyethylene or an ethylene copolymer with a polar group-containing copolymer in the presence of a radical initiator and, as such, there may be mentioned, for example, ethylene/vinylsilane graft copolymer, and ethylene/unsaturated carboxylic acid graft copolymer.

The modified polyolefin resin may also comprises a polymer obtained by crosslinking acid group-containing copolymers with metal ions, for example a polymer obtained by crosslinking ethylene/methacrylic acid copolymers with metal ions.

The modified polyolefin resin preferably comprises ethylene/maleic anhydride copolymer and/or ethylene/glycidyl methacrylate copolymer, among others, in view of their excellent adhesiveness viewpoint.

The above-mentioned urethane resin preferably comprises thermoplastic urethane elastomer, and that comprising a polyurethane as a hard segment and a polyol and/or polyester as a soft segment are preferably used as the thermoplastic urethane elastomer. The polyol as the soft segment component may be a polycarbonate type polyol or an ether type polyol. As the polyester as the soft segment component, there may be mentioned, for example, a caprolactone-derived polyester and an adipate type polyester.

The above-mentioned organic material comprising a polyamide resin, a polyester resin, a polycarbonate resin, a polyamideimide resin, a polyethersulfone [PES] resin, a polysulfone resin, an urethane resin, a polyphenylene oxide [PPO] resin, a polyetherimide resin, a polyacetal resin, a polyvinyl alcohol resin, an ethylene/vinyl alcohol resin and/or a modified polyolefin resin are preferred among others in view of the fact that it is relatively easy to mold them by simultaneous multilayer molding, such as melt coextrusion molding, with the above-mentioned fluorine-containing molded material and that they are polymers having those sites to be mentioned later herein which have affinity for and/or reactivity with the fluorine-containing cohesive ethylenic polymer. Each preferred organic material may comprise one or two or more of these.

The above-mentioned organic material is preferably one comprising a polymer carrying a site having affinity for and/or reactivity with the fluoropolymer of the invention such as the cohesive, fluorine-containing ethylene polymer. While a description is given herein below of the "a site having affinity for and/or reactivity with the fluoropolymer" taking the "fluorine-containing cohesive ethylenic polymer" as a typical example of the fluoropolymer, it is to be construed that the characteristics of the "fluoropolymer" includes the contents of the following explanation relating to the "fluorine-containing cohesive ethylenic polymer".

The phrase "a site having affinity for and/or reactivity with the fluorine-containing cohesive ethylenic polymer" as used herein may be any group having affinity for and/or reactivity with the fluorine-containing cohesive ethylenic polymer and thus conceptually includes not only those groups generally termed functional groups but also those groups generally termed bonds, such as ester bonds, like the concept of the cohesive sites mentioned hereinabove. The site having affinity for and/or reactivity with the fluorine-containing cohesive ethylenic polymer is not particularly restricted but preferably is, for example, hydroxyl group, a carbonate group, an amino group, an amide group, imide group, mercapto group, sulfonic acid group, an epoxy group, ester bond, carboxyl group and/or isocyanato group. The mercapto group, sulfonic group and/or carboxyl group may be in the form of a salt.

As the carbonate group and amide group, there may be mentioned the same ones as specifically mentioned hereinabove referring to the cohesive site. The hydrogen atom or atoms bound to the nitrogen atom of an amino, imino or like group may be substituted, for example, by a hydrocarbon group, such as an alkyl group.

As the metallic material forming the other layer of the laminate of the invention, there may be mentioned, for example, a metal such as aluminum, iron, nickel, titanium, molybdenum, magnesium, manganese, copper, silver, lead, chromium, beryllium, tungsten, and cobalt, a compound of these metals, and an alloy comprising two or more of these metals.

The metallic material layer may be one subjected to such treatment for corrosion prevention as coating the metal surface with another metal by electroplating, hot-dip plating, chromizing, siliconizing, calorizing, sherardizing, sputtering, etc., phosphate coat formation by phosphate treatment, metal oxide formation by anodic oxidation or oxidation by heating, electrochemical corrosion prevention treatment, etc.

The metallic material layer may also be one subjected, for the purpose of improving the adhesion to the fluorine-containing molded material layer, to surface conversion treatment with phosphates, sulfuric acid, chromic acid, oxalic acid, etc.; or surface roughening treatment such as sand blasting, shot blasting, grit blasting, honing, paper scratching, wire scratching, hairline treatment, etc.

The vitreous materials forming the other layer of the laminate of the invention is not particularly restricted but includes, among others, glass ceramics, foamed glass, heat ray reflecting glass, heat ray absorbing glass, double glazing; tiles, ceramics, bricks, and other ceramic substrates; natural stones; concrete-based substrates or cement-based substrates; single crystal silicon, polycrystalline silicon, and amorphous silicon.

The method of obtaining the laminate of the invention may be, for example, any of the following:

(A) The method comprising melting a powder or pellets, for instance, of the fluorine-containing cohesive ethylenic polymer by heating and coating the molded material obtained in advance by molding the material constituting the other layer with the melt to produce a laminate comprising the fluorine-containing molded material layer and the other layer.

The heating of the fluorine-containing cohesive ethylenic polymer powder or pellets is preferably carried out at a temperature not lower than the melting point of the fluorine-containing cohesive ethylenic polymer.

(B) The method comprising coating the outside and/or inside of a molded material obtained in advance by molding the material constituting the other layer with a powder of the fluorine-containing cohesive ethylenic polymer (powder coating) and subjecting the coated material to thermocompression bonding at a predetermined temperature and pressure to produce a laminate comprising the fluorine-containing molded material layer and the other layer.

(C) The method comprising subjecting a molded material obtained in advance by molding the material constituting the other layer and a fluorine-containing molded material obtained in advance by molding the fluorine-containing cohesive ethylenic polymer in a powder or pellet form, for instance, to bonding by pressing or laminating, for instance, to give a laminate.

(D) The method comprising applying a dispersion prepared by dispersing the fluorine-containing cohesive ethylenic polymer to a molded material obtained in advance by molding the material constituting the other layer or impregnating a molded material obtained in advance by molding the material constituting the other layer with a dispersion prepared by dispersing the fluorine-containing cohesive ethylenic polymer to produce a laminate comprising the fluorine-containing molded material layer and the other layer. The dispersion may be an aqueous dispersion or an organic dispersion.

In cases where the other layer is made from such an organic material as mentioned above, the method of obtaining the laminate may also be any of the following methods in addition to the above methods (A) to (D):

(a) The method comprising coextruding the fluorine-containing cohesive ethylenic polymer in a powder or pellet form, for instance, and the organic material in contact with each other under heating and pressure, namely by the so-called melt coextrusion technique, to give a laminate.

(b) The method comprising preparing a fluorine-containing molded material in advance using the fluorine-containing cohesive ethylenic polymer in a powder or pellet form, for instance, and coating the fluorine-containing molded material with the organic material melted by heating to thereby produce a laminate comprising the fluorine-containing molded material layer and the other layer.

(c) The method comprising coating the outside and/or inside of a fluorine-containing molded material obtained in advance by molding the fluorine-containing cohesive ethylenic polymer in a powder or pellet form, for instance, with a powder of the organic material (powder coating) and subjecting the coated material to thermocompression bonding at a predetermined temperature and pressure to give a laminate comprising the fluorine-containing molded material layer and the other layer. The heating of the organic material is preferably carried out at a temperature not lower than the melting point of the organic material.

From the adhesion viewpoint, the above laminate is preferably one produced by lamination using the coextrusion molding technique described above for the method (a).

In cases where the other layer is made from a metallic material, the method of obtaining the laminate further includes, in addition to the methods (A) to (D), the method comprising forming the other layer on a fluorine-containing molded material obtained in advance by molding the fluorine-containing cohesive ethylenic polymer in a powder or pellet form, for instance, by using the vapor deposition technique, such as the chemical vapor deposition or physical vapor deposition technique. The vapor deposition technique is not particularly restricted but may be any of the methods known in the art.

The layer, obtained by using any of the methods mentioned above, of the laminate of the invention may serve also as a lining.

The laminate may comprises at least two layers, with the inner layer being a layer comprising the fluorine-containing cohesive ethylenic polymer, for instance, optionally containing the above-mentioned conductive filler, and the outer layer being the above-mentioned other layer (hereinafter sometimes referred to as "laminate (P)"). The laminate (P) may comprises at least three layers, with the inner layer being a layer comprising the fluorine-containing cohesive ethylenic polymer containing the above-mentioned conductive filler incorporated therein, the outer layer being the above-mentioned other layer and the intermediate layer being a layer comprising the fluorine-containing cohesive ethylenic polymer containing no conductive filler, or it may comprises at least three layers, with the inner and outer layer each being a layer comprising the fluorine-containing cohesive ethylenic polymer optionally containing the above-mentioned conductive filler incorporated therein and the intermediate layer being the above-mentioned other layer.

When the fluorine-containing molded material layer is in contact with the above-mentioned other layer, the laminate of the invention, which comprises the above-mentioned fluorine-containing molded material, shows good interlaminar bonding between both the layers and is also excellent in stress cracking resistance, chemical resistance, liquid chemical permeability, etc.

The fluorine-containing fabricated article of the invention is made with the above-mentioned fluorine-containing molded material or the above-mentioned laminate. The fluorine-containing fabricated article is not particularly restricted but may be any one obtained by processing the fluorine-containing molded material or laminate. Thus, for example, it may be a film, a sheet, a hose or a tube or the like obtained by using the fluorine-containing molded material or laminate, or may be a lining or a lined body obtained by using the fluorine-containing molded material or laminate.

The fluorine-containing fabricated article is not particularly restricted but includes, among others, the following:

(1) Hoses or tubes; a tube for transport of a fuel or a hose for transport of a fuel such as an automobile fuel transport tube or an automobile fuel transport hose, an automobile radiator hose, an air conditioner hose, an brake hose, an electric wire covering, an optical fiber covering, a tube for transport of a drink, a tube for transport of a liquid food, a tube for transport of a liquid chemical, a piping tube for a paint, a hose for transport of a crude oil or a crude oil refined product;

(2) Films and sheets; a member required to have high level of chemical resistance, such as a diaphragm of a diaphragm pump and various packing members, a film for agricultural use, a lining of a liquid chemical reservoir, a inside lining for a lorry tank and the like, a solar cell covering material and like weathering-resistant covering material, a flame-retardant, scattering preventing film for fireproof safety glass, a laminated steel sheet used in the fields of building/construction and household electric appliances, a transparent and weathering-resistant material used in roofing;

(3) Bottles, containers, tanks; a liquid chemical container, in particular containers for liquid chemicals used an semiconductor manufacture which are required to have chemical resistance and low contamination potential, a paint container required to be returnable, a liquid chemical reservoir or tank obtained by using the above-mentioned liquid chemical reservoir lining material, tank inside lining material, etc.

The fluorine-containing fabricated article is not particularly limited to the molded articles mentioned above under (1), (2) and (3) as examples but may have a complicated form or shape different from those of the molded articles mentioned above under (1), (2) or (3). Such a complicatedly shaped one can be obtained by the above-mentioned injection molding or insert molding using a mold, for instance.

Since it comprises the above-mentioned fluoropolymer reduced in oligomer content to a level within the above-specified range, the fluorine-containing fabricated article of the invention is excellent in interlaminar bonding and stress cracking resistance and can be suitably used, in particular, as such a film, sheet, hose or tube as mentioned above.

The hose or tube may be partly or wholly corrugated or convoluted. A hose or tube having such a shape is hereinafter sometimes referred to as "corrugated hose" or "corrugated tube". Generally, the corrugated or convoluted shape is given to the corrugated hose or corrugated tube for providing the hose or tube with flexibility to thereby improve the degree of freedom in piping layout designing, the workability in installation and the shock absorption on the occasion of use.

The fluorine-containing fabricated article comprising the laminate of the invention is excellent in interlaminar bonding and stress cracking resistance and, therefore, can be suitably used in the form of a corrugated hose or corrugated tube as well.

The above-mentioned fluorine-containing fabricated article, which comprises the above-mentioned fluorine-containing molded article or the above-mentioned laminate, is excellent in interlaminar bonding, stress cracking resistance and so forth, as mentioned above, and can be suitably used as a piping tube for a paint, a tube for transport of a drink, a tube for transport of a liquid food, a tube for transport of a liquid chemical, a tube for transport of a fuel, a hose for transport of a crude oil or a crude oil refined product.

The fluorine-containing fabricated article may be used as a tube for transport of a drink and as a tube for transport of a liquid food. The fluorine-containing fabricated article may also be used as a tube for transport of a fuel and as a hose for transport of a crude oil or a crude oil refined product.

When it has the fluorine-containing cohesive ethylenic polymer-based conductive composition layer as the inner layer, the fluorine-containing fabricated article can be used most suitably as a tube for transport of a fuel. The tube for transport of a fuel is not particularly restricted but, for example, is an automobile fuel transportation tube or the like.

The fluorine-containing fabricated article can be given a bottle, container, tank or like shape by multilayer blow molding. The fluorine-containing fabricated article can also be a multilayer injection-molded article produced by multilayer injection molding.

The "liquid chemical" so referred to herein is not particularly restricted but includes, among others, organic acids such as acetic acid, formic acid, cresol and phenol; inorganic acids such as hydrochloric acid, nitric acid and sulfuric acid; alkaline solutions such as solutions of sodium hydroxide and potassium hydroxide; alcohols such as methanol and ethanol; amines such as ethylenediamine, diethylenetriamine and ethanolamine; amides such as dimethylacetamide; esters such as ethyl acetate and butyl acetate; mixtures of two or more of these; and other organic and inorganic liquids.

The "fuel" so referred to herein is not particularly restricted but includes, among others, gasoline, petroleum, light oil, heavy oil and other fuel oils; pseudo fuels such as Fuel C; mixed fuels comprising these and a peroxide, or methanol, ethanol, etc.

The "crude oil or crude oil refined product" so referred to herein include a crude oil and/or a crude oil refined product obtained by crude oil refining. The "crude oil refining" may be simple refining but can conceptually include a part or the whole of various processes generally recognized as crude oil or petroleum refining processes, such as desalting, distillation, cracking, reforming, desiccation, etc. The "crude oil or crude oil refined product" is not particularly restricted but includes, among others, crude oil, gasoline, petroleum, light oil, heavy oil, kerosene and naphtha. The "crude oil or crude oil refined product" may be a gas obtained from crude oil, and the gas includes, among others, hydrocarbons such as methane; and natural gas comprising such hydrocarbons.

BEST MODES FOR CARRYING OUT THE INVENTION

The following examples illustrate the present invention in further detail. The examples are, however, by no means limitative of the scope of the present invention.

The measurements for the respective items were carried out as follows.

(1) Extractable Matter Content in a Fluorine-Containing Cohesive Ethylenic Polymer A 300-ml pressure autoclave was charged with 25.5 g±0.1 g of cubic pellets, 2 to 3 mm in side length, of the fluorine-containing cohesive ethylenic polymer as accurately weighed to fourth decimal places, together with 170 ml of 1,1-dichlorofluoroethane (hereinafter sometimes referred to as "HCFC-141b") and, after tight closure and nitrogen substitution, the autoclave was allowed to stand in an electric oven at 120° C. for 60 hours. Then, the autoclave was taken out, sufficiently cooled, and opened, the fluorine-containing cohesive ethylenic polymer was fractionated in a 300-ml eggplant-shaped flask accurately weighed in advance to four decimal places, and the extractable matter-containing HCFC-141b was recovered. The extractable matter-containing HCFC-141b thus recovered was concentrated and, after removal of most of the HCFC-141b, the eggplant-shaped flask was further dried in an electric oven at 80° C. for 24 hours, the extractable matter mass (g) was measured, and the extractable matter content B1 (% by mass) in the fluorine-containing cohesive ethylenic polymer was calculated according to the following formula.

$$B1 (\% \text{ by mass}) = (C/D) \times 100$$

C: Mass (g) of the extractable matter
D: Mass (g) of the fluorine-containing cohesive ethylenic polymer initially charged (2) Oligomer Content in a Fluorine-Containing Cohesive Ethylenic Polymer The extract obtained as described above under (1) was analyzed under the following conditions using Senshu Scientific Co. model SSC-7100 ultrahigh temperature gel permeation chromatograph (GPC).

| Apparatus used | |
|---|---|
| Column: | JORDI No. 15025 |
| Detector: | RI |
| Measurement conditions | |
| Column thermostat temperature: | 180° C. |
| Detector temperature: | 180° C. |
| Feed rate: | 0.8 ml/min |

The working curve was prepared by measuring standard polystyrene species having a number average molecular weight of 2,000,000 to 14,500,000 under the same conditions.

Based on the peaks obtained, the area of the fraction not higher in molecular weight than 35,000 or not higher than 10,000 on the polystyrene equivalent basis was determined, and the content $B_2$ (% by mass) of oligomers not higher in molecular weight than 35,000 or not higher than 10,000 in the fluorine-containing cohesive ethylenic polymer was calculated as follows:

$$B_2 (\% \text{ by mass}) = B \times E$$

E: Proportion of the area of the fraction not higher than 35,000 or 10,000 in molecular weight on the polystyrene equivalent basis to the peak area obtained by the above high-temperature GPC measurement.

(3) Stress Cracking Resistance

The fluorine-containing cohesive ethylenic polymer was molded by extrusion molding using a ø 30 mm single-screw extruder equipped with a T die, and JIS K 6301 No. 1 dumbbells were stamped out from the thus-obtained 200-μm-thick film and used as test specimens. Each test specimen obtained was clamped on the stretcher clamps so that the chuck-to-chuck distance might become 70 mm and stretched in a mixture of toluene, isooctane and methanol (=42.5:42.5:15% by volume) (hereinafter referred to as "CM15") at 10° C. at a rate of 20 mm/min, and the elongation (%) at which the occurrence of cracking was confirmed by visual observation was recorded and used as an indicator of stress cracking resistance. Thus, a greater elongation value indicates better stress cracking resistance.

(4) Determination of the Number of Carbonate Groups

The fluorine-containing cohesive ethylenic polymer in a white powder form or cut pieces of melt-extruded pellets of the fluorine-containing cohesive ethylenic polymer were compression molded at room temperature to give a film with a thickness of 50 to 200 μm. Upon infrared spectral analysis of this film, the peak due to the carbonyl group of the carbonate group [—OC(=O)O—] appeared at the absorption wavelength of 1790 to 1820 cm$^{-1}$ ($\nu_{C=O}$). Thus, the absorbance of that $\nu_{C=O}$ peak was measured, and the number N of carbonate groups per 10$^6$ main chain carbon atoms of the fluorine-containing cohesive ethylenic polymer was calculated according to the formula (1):

$$N=500\,AW/\epsilon df \qquad (1)$$

A: Absorbance of the $\nu_{C=O}$ peak due to the carbonate group (—OC(=O)O—)
ε: Molar absorption coefficient of the $\nu_{C=O}$ peak due to the carbonate group (—OC(=O)O—). Based on the data on model compounds, ε was estimated to be 170 (1 cm$^{-1}$·mol$^{-1}$).
W: Average molecular weight of monomer units as calculated based on the composition of the fluorine-containing cohesive ethylenic polymer
d: Density of the film (g/cm$^3$)
f: Thickness of the film (mm)

The infrared spectral analysis was carried out by 40 repetitions of scanning using a Perkin-Elmer model 1760X FTIR spectrometer (product of Perkin-Elmer). The absorbance of the peak at 1790 to 1820 cm$^{-1}$ was determined from the IR spectrum obtained using Perkin-Elmer Spectrum for Windows Ver. 1.4C, with the baseline being automatically judged. The film thickness was measured using a micrometer.

(5) Determination of the Number of Carboxyl Groups

Upon infrared spectral analysis of a film obtained in the same manner as described above under (4), the peak due to the carbonyl group of the carboxyl group [—C(=O)OH] appeared at the absorption wavelength of 1760 to 1800 cm$^{-1}$ ($\nu_{C=O}$). Thus, the absorbance of that $\nu_{C=O}$ peak was measured. The number of carboxyl groups was calculated in the same manner as in the determination of the number of carbonate groups under (4) using the above formula (1) except that the molar absorption coefficient E of the carboxyl group-due $\nu_{C=O}$ peak was estimated to be 530 (1 cm$^{-1}$·mol$^{-1}$) based on the data on model compounds.

(6) Determination of the Number of Amide Groups

Upon infrared spectral analysis of a film obtained in the same manner as described above under (4), the peak due to the carbonyl group of the amide group [—C(=O)NH$_2$] appeared at the absorption wavelength of 1740 to 1800 cm$^{-1}$ ($\nu_{C=O}$). Thus, the absorbance of that $\nu_{C=O}$ peak was measured. The number of amide groups was calculated in the same manner as in the determination of the number of carbonate groups under (4) using the above formula (1) except that the molar absorption coefficient ε of the amide group-due $\nu_{C=O}$ peak was estimated to be 940 (1 cm$^{-1}$·mol$^{-1}$) based on the data on model compounds.

(7) Determination of the Number of —C(=O)F Groups

Upon infrared spectral analysis of a film obtained in the same manner as described above under (4), the peak due to the carbonyl group of the —C(=O)F group appeared at the absorption wavelength of 1875 to 1890 cm$^{-1}$ ($\nu_{C=O}$). Thus, the absorbance of that $\nu_{C=O}$ peak was measured. The number of —C(=O)F groups was calculated in the same manner as in the determination of the number of carbonate groups under (4) using the above formula (1) except that the molar absorption coefficient ε of the —C(=O)F group-due $\nu_{C=O}$ peak was estimated to be 600 (1 cm$^{-1}$·mol$^{-1}$) based on the data on model compounds.

(8) Determination of the Number of Other Carbonyl Groups

A film obtained in the same manner as described above under (4) was subjected to infrared spectral analysis, and the number of such carbonyl groups other than the groups measurable by the methods mentioned above under (4) to (7) as the formyl group, ester bond, acid anhydride bond, isocyanate bond, imide group, urethane bond, carbamoyl group, carbamoyloxy group, ureido group, and oxamoyl group was determined. The number of other carbonyl groups was calculated in the same manner as in the determination of the number of carbonate groups under (4) using the above formula (1) except that the molar absorption coefficient E of the other carbonyl group-due $\nu_{C=O}$ peak was estimated to be 600 (1 cm$^{-1}$·mol$^{-1}$) based on the data on model compounds.

(9) Determination of the Number of Hydroxyl Groups

Upon infrared spectral analysis of a film obtained in the same manner as described above under (4), the peak due to the hydroxyl group [—OH] appeared at the absorption wavelength of 3630 to 3660 cm$^{-1}$ ($\nu_{OH}$). Thus, the absorbance of that $\nu_{OH}$ peak was measured. The number of hydroxyl groups was calculated in the same manner as in the determination of the number of carbonate groups under (4) using the above formula (1) except that the molar absorption coefficient ε of the hydroxyl group-due $\nu_{OH}$ peak was estimated to be 104 (1 cm$^{-1}$·mol$^{-1}$) based on the data on model compounds.

(10) Melting Point (Tm) Measurement

Using Seiko's differential scanning calorimeter [DSC], the melting peak was recorded at a temperature raising rate of 10° C./min, and the temperature corresponding to the maximum value was taken as the melting point (Tm).

(11) Determination of the Composition of the Fluorine-Containing Cohesive Ethylenic Polymer The determination was carried out based on $^{19}$F-NMR analysis.

(12) Melt Flow Rate (MFR) Measurement

Using a melt indexer (product of Toyo Seiki Seisakusho, Ltd.), the mass (g) of the polymer extruded, under a load of 5 kg, through a nozzle with a diameter of 2 mm and a length of 8 mm per unit time (10 minutes) at each temperature was measured.

(13) Multilayer Tube Interlaminar Bond Strength

Test pieces, 1 cm in width, were cut out from the tube and subjected to 180° peel testing at a rate of 25 mm/min using a Tensilon universal testing machine, and the mean of 5 maximum points on elongation-tensile strength graphs was determined as the interlaminar bond strength (N/cm).

(14) Surface Resistance Value Measurement

Using a melt indexer (product of Toyo Seiki Seisakusho, Ltd.), the fluorine-containing cohesive ethylenic polymer was extruded through a nozzle with an orifice diameter ø of 2 mm and a length of 8 mm at an arbitrary temperature of 200° C. to 400° C., and rods having a length of at least 9 cm were cut out from the extrudate strand obtained as used as test specimens. The specimens obtained were allowed to stand in an atmosphere maintained at a temperature of 25±2° C. and a relative humidity of 60±5% for at least 8 hours and, then, the surface resistance values were measured using a battery-driven insulation resistance tester (rating: 500 V/100 MΩ; product of Yokogawa Electric Corporation) with terminals being brought into contact with the specimen surface at a distance of 7 cm.

The surface resistance value of each multilayer tube was measured according to SAE J2260.

The polyamide resins were analyzed in the following manner.

(15) Amine Value Determination

One gram of each polyamide resin was dissolved in 50 ml of m-cresol with heating, the solution was titrated with 1/10 N aqueous p-toluenesulfonic acid with thymol blue as an indicator, and the amount of amino groups occurring in 106 g of the polyamide was determined.

(16) Acid Value Determination

One gram of each polyamide resin was dissolved in 50 ml of benzyl alcohol with heating, the solution was titrated with a ⅟₃₀ N sodium hydroxide/benzyl alcohol solution with phenolphthalein as an indicator, and the amount of carboxyl groups occurring in 10⁶ g of the polyamide was determined.

(17) Relative Viscosity Determination

According to JIS K 6810, 1 g of each polyamide resin was dissolved in 100 ml of 98% sulfuric acid and the solution was subjected to measurement using an Ubbellohde viscometer at 25° C.

Synthesis Example 1

Synthesis of a Carbonate Group-Containing, Fluorine-Containing Cohesive Ethylenic Polymer (F-A)

A 1,280-L autoclave was charged with 380 L of distilled water and, after thorough nitrogen substitution, further charged with 84 kg of perfluorocyclobutane, 166 kg of hexafluoropropylene and 0.5 kg of perfluoro(1,1,5-trihydro-1-pentene), and the system inside was maintained at 26° C. and at a rate of stirring of 200 rpm. Then, tetrafluoroethylene was charged into the autoclave under pressure until 0.86 MPa and, further, ethylene was charged thereinto until 0.92 MPa. The system inside temperature was raised to 35° C., followed by addition of 8.5 kg of a 50% methanol solution of di-n-propyl peroxydicarbonate to initiate the polymerization reaction. The system inside pressure was maintained at 1.15 MPa by continuously feeding a mixed gas composed of tetrafluoroethylene, ethylene and hexafluoropropylene in the mole percentage ratio of 41.0:44.0:15.0, since otherwise the system inside pressure would lower with the progress of the polymerization. Then, a total of 2.5 kg of perfluoro(1,1,5-trihydro-1-pentene) was continuously charged into the autoclave, and the stirring was continued for 20 hours. After pressure release to atmospheric pressure, the reaction product was washed with water and dried to give 200 kg of a powder.

An autoclave was then charged with 100 parts of the powder obtained and 700 parts of 1,1-dichloro-1-fluoroethane [HCFC-141b], and the mixture was stirred at 120° C. for 40 hours. Then, the stirring was discontinued, and HCFC-141b was drawn out from the bottom of the autoclave. A fresh 700-part portion of HCFC-141b was charged under pressure into the autoclave from the top thereof, and the above powder was washed with the HCFC-141b again with stirring, the HCFC-141b was drawn out from the bottom, and the powder was recovered. The powder recovered was dried to give a fluorine-containing cohesive ethylenic polymer as a powder.

Then, the thus-obtained fluorine-containing cohesive ethylenic polymer was pelletized by melt-kneading in a ø 40 mm twin-screw extruder (product of Ikegai Corporation; model PCM-45) having a vent mechanism equipped with a pressure reducing device, with the screws being revolved in the same direction, under the conditions given in Table 1, and the pellets obtained were further heated in an oven at 130° C. for 48 hours to recover the fluorine-containing cohesive ethylenic polymer (F-A) in pellet form. The results of analysis for the above-mentioned items are shown in Table 2.

Synthesis Example 2

Synthesis of a Carbonate Group-Containing, Fluorine-Containing Cohesive Ethylenic Polymer (F-B)

The same autoclave as used in Synthesis Example 1 was charged with 380 L of distilled water and, after thorough nitrogen substitution, further charged with 166 kg of perfluorocyclobutane, 84 kg of hexafluoropropylene and 0.3 kg of perfluoro(1,1,5-trihydro-1-pentene), and the system inside was maintained at 35° C. and at a rate of stirring of 200 rpm. Then, tetrafluoroethylene was charged into the autoclave under pressure until 0.88 MPa and, further, ethylene was charged thereinto until 0.94 MPa, followed by further addition of 9.0 kg of a 50% methanol solution of di-n-propyl peroxydicarbonate to initiate the polymerization reaction. The system inside pressure was maintained at 0.94 MPa by continuously feeding a mixed gas composed of tetrafluoroethylene, ethylene and hexafluoropropylene in the mole percentage ratio of 46.0:44.0:10.0, since otherwise the system inside pressure would lower with the progress of the polymerization. Then, a total of 2.7 kg of perfluoro(1,1,5-trihydro-1-pentene) was continuously charged into the autoclave. The subsequent extraction treatment carried out in the same manner as in Synthesis Example 1 using HCFC-141b gave 200 kg of a fluorine-containing cohesive ethylenic polymer as a powder.

The thus-obtained fluorine-containing cohesive ethylenic polymer in powder form was pelletized using the same extruder as used in Synthesis Example 1 except that the melt-kneading conditions and pellet heating conditions shown in Table 1 were employed, to give a fluorine-containing cohesive ethylenic polymer (F-B) in pellet form. The results of analysis for the above-mentioned items are shown in Table 2.

Synthesis Example 3

Synthesis of a Carbonate Group-Containing, Fluorine-Containing Cohesive Ethylenic Polymer (F-C)

The same autoclave as used in Synthesis Example 1 was charged with 380 L of distilled water and, after thorough nitrogen substitution, further charged with 230 kg of perfluorocyclobutane and 0.9 kg of perfluoro(1,1,5-trihydro-1-pentene), and the system inside was maintained at 20° C. and at a rate of stirring of 200 rpm. Then, tetrafluoroethylene was charged into the autoclave under pressure until 0.78 MPa and, further, ethylene was charged thereinto until 0.89 MPa and, after raising the system inside temperature to 35° C., 1.1 kg of cyclohexane was added, followed by addition of 1.6 kg of a 50% methanol solution of di-n-propyl peroxydicarbonate to initiate the polymerization reaction. The system inside pressure was maintained at 1.20 MPa by continuously feeding a mixed gas composed of tetrafluoroethylene and ethylene in the mole percentage ratio of 57:43, since otherwise the system inside pressure would lower with the progress of the polymerization. Then, a total of 6.2 kg of perfluoro(1,1,5-trihydro-1-pentene) was continuously charged into the autoclave. The subsequent procedure carried out in the same manner as in Synthesis Example 1 gave 200 kg of a fluorine-containing cohesive ethylenic polymer as a powder.

The thus-obtained fluorine-containing cohesive ethylenic polymer in powder form was pelletized using the same extruder as used in Synthesis Example 1 except that the melt-kneading conditions and pellet heating conditions shown in Table 1 were employed, to give a fluorine-containing cohesive ethylenic polymer (F-c) in pellet form. The results of analysis for the above-mentioned items are shown in Table 2.

Synthesis Example 4

Synthesis of a Carbonate Group-Containing, Fluorine-Containing Cohesive Ethylenic Polymer (F-D)

The same autoclave as used in Synthesis Example 1 was charged with 380 L of distilled water and, after thorough nitrogen substitution, further charged with 304 kg of perfluorocyclobutane and 42.8 kg of perfluoro(methyl vinyl ether) [$CF_2$=$CFOCF_3$], and the system inside was maintained at 35° C. and at a rate of stirring of 200 rpm. Then, tetrafluoroethylene was charged into the autoclave under pressure until 0.70 MPa, followed by feeding of 3.0 kg of a 50% methanol solution of di-n-propyl peroxydicarbonate to initiate the polymerization reaction. A mixed gas composed of tetrafluoroethylene and perfluoro(methyl vinyl ether) in the mole percentage ratio of 90.7:9.3 was then continuously fed to thereby maintain the system inside pressure at 0.70 MPa since otherwise the system inside pressure would lower with the progress of the polymerization. The subsequent procedure carried out in the same manner as in Synthesis Example 1 gave 180 kg of a fluorine-containing cohesive ethylenic polymer as a powder.

The thus-obtained fluorine-containing ethylenic polymer in powder form was pelletized using the same extruder as used in Synthesis Example 1 except that the melt-kneading conditions and pellet heating conditions shown in Table 1 were employed, to give a fluorine-containing cohesive ethylenic polymer (F-D) in pellet form. The results of analysis for the above-mentioned items are shown in Table 2.

Synthesis Example 5

Synthesis of a Carbonate Group-Containing, Fluorine-Containing Cohesive Ethylenic Polymer (F-E)

An autoclave was charged with 100 parts of the powder obtained in Synthesis Example 3 and 700 parts of 1,1-dichloro-1-fluoroethane [HCFC-141b], and the charge was stirred at 120° C. for 40 hours. Then, the stirring was discontinued, and the HCFC-141b solution alone was drawn out from the bottom of the autoclave. A fresh 700-part portion of HCFC-141b was charged under pressure into the autoclave from the top, the powder was washed again with HCFC-141b with stirring, the HCFC-141b was then drawn out from the bottom, and the powder was recovered and dried.

The fluorine-containing cohesive ethylenic polymer in powder form after drying was pelletized using the same extruder as used in Synthesis Example 1 except that the melt-kneading conditions and pellet heating conditions shown in Table 1 were employed, to give a fluorine-containing cohesive ethylenic polymer (F-E) in pellet form. The results of analysis for the above-mentioned items are shown in Table 2.

Synthesis Example 6

Synthesis of a Carbonate Group-Containing, Fluorine-Containing Cohesive Ethylenic Polymer (F-F)

The fluorine-containing ethylenic polymer obtained in Synthesis Example 4 in powder form and acetylene black, as a conductive filler, were dry-blended in a fluorine-containing ethylenic polymer powder-to-acetylene black ratio of 90:10 (mass ratio), and the mixture was pelletized using the same extruder as used in Synthesis Example 1 except that the melt-kneading conditions and pellet heating conditions shown in Table 1 were employed, to give a fluorine-containing cohesive ethylenic polymer (F-F) in pellet form. The results of analysis for the above-mentioned items are shown in Table 2. The surface resistance value as measured by the above-mentioned method of surface resistance value measurement using the fluorine-containing cohesive ethylenic polymer (F-F) obtained in pellet form was $10^5$ Ω·cm/cm.

Synthesis Example 7

Synthesis of a Carbonate Group-Containing, Fluorine-Containing Cohesive Ethylenic Polymer (F-G)

The fluorine-containing ethylenic polymer obtained in Synthesis Example 3 in powder form was pelletized using the same extruder as used in Synthesis Example 1 under the melt-kneading conditions and pellet heating conditions shown in Table 1 were employed, to give a fluorine-containing cohesive ethylenic polymer in pellet form. The fluorine-containing cohesive ethylenic polymer thus obtained in pellet form was heat-treated in a humidifier oven enabling steam introduction at 230° C. for 3 hours to give a fluorine-containing cohesive ethylenic polymer (F-G). The results of analysis for the above-mentioned items are shown in Table 2.

Synthesis Example 8

Synthesis of a Amide Group-Containing, Fluorine-Containing Cohesive Ethylenic Polymer (F-H)

The same autoclave as used in Synthesis Example 1 was charged with 380 L of distilled water and, after thorough nitrogen substitution, further charged with 210 kg of perfluorocyclobutane and 0.5 kg of perfluoro(1,1,5-trihydro-1-pentene), and the system inside was maintained at 35° C. and at a rate of stirring of 200 rpm. Then, tetrafluoroethylene was charged into the autoclave under pressure until 0.71 MPa, followed by feeding of 5 kg of a 50% methanol solution of di-n-propyl peroxydicarbonate to initiate the polymerization reaction. The system inside pressure was maintained at 0.79 MPa by continuously feeding a mixed gas composed of tetrafluoroethylene and ethylene in the mole percentage ratio of 57:43, since otherwise the system inside pressure would lower with the progress of the polymerization. During the polymerization reaction, at the time when the amount of the tetrafluoroethylene-ethylene mixed gas added amounted to 40 kg, 300 g of cyclohexane was added and, further, a total of 6.2 kg of perfluoro(1,1,5-trihydro-1-pentene) was continuously fed, and the stirring was continued for 18 hours. After pressure release to atmospheric pressure, 10 kg of 28% aqueous ammonia was added, and the reaction was allowed to proceed for 5 hours while the system inside was maintained at 80° C. The product was then washed with water and dried to give 200 kg of a fluorine-containing cohesive ethylenic polymer as a powder.

The fluorine-containing cohesive ethylenic polymer obtained in powder form was pelletized using the same extruder as used in Synthesis Example 1 under the melt-kneading conditions and pellet heating conditions shown in Table 1 were employed, to give a fluorine-containing cohesive ethylenic polymer (F-H) in pellet form. The results of analysis for the above-mentioned items are shown in Table 2.

Synthesis Example 9

Synthesis of a Haloformyl Group-Containing, Fluorine-Containing Cohesive Ethylenic Polymer (F-I)

The procedure of Synthesis Example 8 was followed in the same manner except that the addition of 28% aqueous ammonia was omitted, to give 200 kg of a powder.

The powder obtained was pelletized using the same extruder as used in Synthesis Example 1 except that the melt-kneading conditions and pellet heating conditions shown in Table 1 were employed, to give 200 kg of a fluorine-containing cohesive ethylenic polymer in pellet form.

The fluorine-containing cohesive ethylenic polymer obtained in pellet form was heat-treated in a vacuum drier at 230° C. for 3 hours to give a fluorine-containing cohesive ethylenic polymer (F-I). The results of analysis for the above-mentioned items are shown in Table 2.

Synthesis Example 10

Synthesis of a Hydroxyl Group-Containing, Fluorine-Containing Cohesive Ethylenic Polymer (F-J)

A 1,280-L autoclave was charged with 365 L of distilled water and, after thorough nitrogen substitution, further charged with 300 kg of perfluorocyclobutane, 29.6 kg of perfluoro(propyl vinyl ether) [$CF_2$=$CFOCF_2CF_2CF_3$] and 0.52 kg of $CH_2$=$CFCF_2OCF(CF_3)CF_2OCF(CF_3)CH_2OH$ and, after further addition of 35 kg of methanol, the system inside was maintained at 36° C. and at a rate of stirring of 200 rpm. Then, tetrafluoroethylene was charged into the autoclave under pressure until 0.83 MPa, followed by feeding of 0.7 kg of a 50% methanol solution of di-n-propyl peroxydicarbonate to initiate the polymerization reaction. The system inside pressure was maintained at 0.83 MPa by continuously feeding tetrafluoroethylene gas, since otherwise the system inside pressure would lower with the progress of the polymerization. After addition of each 15-kg portion of tetrafluoroethylene gas, 0.81 kg of perfluoro(propyl vinyl ether) and 0.52 kg of $CH_2$=$CFCF_2OCF(CF_3)CF_2OCF(CF_3)CH_2OH$ were fed and, in this manner, the stirring was continued for 27 hours. After pressure release to atmospheric pressure, 20 kg of 28% aqueous ammonia was added, and the reaction was allowed to proceed for 5 hours while maintaining the system inside at 80° C. The product was washed with water and dried to give 300 kg of a fluorine-containing ethylenic polymer as a powder.

Then, an autoclave was charged with 100 parts of the thus-obtained fluorine-containing ethylenic polymer in powder form and 700 parts of 1,1-dichloro-1-fluoroethane [HCFC-141b], and the mixture was stirred at 120° C. for 40 hours. The stirring was then discontinued, and the HCFC-141b alone was drawn out from bottom of the autoclave. A fresh 700-part portion of HCFC-141b was charged under pressure into the autoclave from the top thereof, the powder was again washed with HCFC-141b with stirring, the HCFC-141b was drawn out from the bottom, and the powder was recovered and dried to give a fluorine-containing cohesive ethylenic polymer as a powder.

The fluorine-containing cohesive ethylenic polymer obtained in powder form was pelletized using the same extruder as used in Synthesis Example 1 under the melt-kneading conditions and pellet heating conditions shown in Table 1 were employed, to give a fluorine-containing cohesive ethylenic polymer (F-J) in pellet form. The results of analysis for the above-mentioned items are shown in Table 2.

Synthesis Example 11

Synthesis of a Hydroxyl Group-Containing, Fluorine-Containing Cohesive Ethylenic Polymer (F-K)

A 1,280-L autoclave was charged with 340 L of distilled water and, after thorough nitrogen substitution, further charged with 280 kg of perfluorocyclobutane, 43 kg of hexafluoropropylene and 0.6 kg of $CH_2$=$CFCF_2OCF(CF_3)CF_2OCF(CF_3)CH_2OH$, and the system inside was maintained at 37° C. and at a rate of stirring of 200 rpm. Then, tetrafluoroethylene was charged into the autoclave under pressure until 0.61 MPa, followed by feeding of vinylidene fluoride under pressure until 1.18 MPa. Then, 2.0 kg of a dichloropentafluoropropane (HCFC-225) solution containing 25% by mass of isobutyl peroxide was added to initiate the polymerization reaction. The system inside pressure was maintained at 1.18 MPa by continuously feeding a mixed gas composed of tetrafluoroethylene, vinylidene fluoride and hexafluoropropylene in the mole percentage ratio of 42.0:52.5:5.5, since otherwise the system inside pressure would lower with the progress of the polymerization. After addition of each 15-kg portion of the mixed gas, 0.5 kg of $CH_2$=$CFCF_2OCF(CF_3)CF_2OCF(CF_3)CH_2OH$ was fed and 0.5 kg of isobutyl peroxide was added at 5-hour intervals and, in this manner, the stirring was continued for 38 hours. After pressure release to atmospheric pressure, the product was washed with water to give 200 kg of a fluorine-containing ethylenic polymer as a powder.

Then, an autoclave was charged with 100 parts of the thus-obtained fluorine-containing ethylenic polymer in powder form and 700 parts of 1,1-dichloro-1-fluoroethane [HCFC-141b], and the mixture was stirred at 80° C. for 40 hours. The stirring was then discontinued, and the HCFC-141b alone was drawn out from bottom of the autoclave. A fresh 700-part portion of HCFC-141b was charged under pressure into the autoclave from the top thereof, the powder was again washed with HCFC-141b with stirring, the HCFC-141b was drawn out from the bottom, and the powder was recovered and dried to give a fluorine-containing cohesive ethylenic polymer as a powder.

The fluorine-containing cohesive ethylenic polymer obtained in powder form was pelletized using the same extruder as used in Synthesis Example 1 under the melt-kneading conditions and pellet heating conditions shown in Table 1 were employed, to give a fluorine-containing cohesive ethylenic polymer (F-K) in pellet form. The results of analysis for the above-mentioned items are shown in Table 2.

Comparative Synthesis Example 1

A fluorine-containing ethylenic polymer in powder form was obtained in the same manner as in Synthesis Example 2 except that the reaction product recovered after pressure release to atmospheric pressure, washed and dried was not subjected to extraction treatment with HCFC-141b.

The powder obtained was pelletized using a ø 50 mm single-screw extruder having no pressure reducing device and no vent mechanism under the melt-kneading conditions and pellet heating conditions shown in Table 1 to give a fluorine-containing ethylenic polymer in pellet form. The results of analysis for the above-mentioned items are shown in Table 2.

Comparative Synthesis Example 2

After pressure release to atmospheric pressure in Comparative Synthesis Example 1, 10 kg of 28% aqueous ammonia was charged into the system, and the reaction was allowed to proceed for 5 hours while maintaining the system inside at 80° C. The product obtained was washed with water and dried to give 200 kg of a fluorine-containing ethylenic polymer as a powder. The fluorine-containing ethylenic polymer obtained in powder form was pelletized using the same extruder as used in Comparative Synthesis Example 1 under the melt-kneading conditions and pellet heating conditions shown in Table 1 to give a fluorine-containing ethylenic polymer in pellet form. The results of analysis for the above-mentioned items are shown in Table 2.

Comparative Synthesis Example 3

The same autoclave as used in Synthesis Example 3 was charged with 380 L of distilled water and, after thorough nitrogen substitution, further charged with 230 kg of perfluorocyclobutane and 0.9 kg of perfluoro(1,1,5-trihydro-1-pentene), and the system inside was maintained at 20° C. and at a rate of stirring of 200 rpm. Then, tetrafluoroethylene was charged into the autoclave under pressure until 0.78 MPa and, further, ethylene was charged thereinto until 0.89 MPa. After raising the system inside temperature to 35° C., 2.5 kg of cyclohexane was added, followed by addition of 2.1 kg of a 50% methanol solution of di-n-propyl peroxydicarbonate to initiate the polymerization reaction. The system inside pressure was maintained at 1.28 MPa by continuously feeding a mixed gas composed of tetrafluoroethylene and ethylene in the mole percentage ratio of 57:43, since otherwise the system inside pressure would lower with the progress of the polymerization. Then, a total of 7.8 kg of perfluoro(1,1,5-trihydro-1-pentene) was continuously charged into the autoclave. The subsequent procedure carried out in the same manner as in Synthesis Example 3 gave 250 kg of a fluorine-containing ethylenic polymer as a powder.

The fluorine-containing ethylenic polymer obtained in powder form was pelletized using the same extruder as used in Comparative Synthesis Example 1 under the melt-kneading conditions and pellet heating conditions shown in Table 1 to give a fluorine-containing ethylenic polymer in pellet form. The results of analysis for the above-mentioned items are shown in Table 2.

Comparative Synthesis Example 4

A fluorine-containing ethylenic polymer in powder form was obtained in the same manner as in Synthesis Example 11 except that the reaction product recovered after pressure release to atmospheric pressure, washed and dried was not subjected to extraction treatment with HCFC-141b.

The fluorine-containing ethylenic polymer obtained in powder form was pelletized using the same extruder as used in Comparative Synthesis Example 1 under the melt-kneading conditions and pellet heating conditions shown in Table 1 to give a fluorine-containing ethylenic polymer in pellet form. The results of analysis for the above-mentioned items are shown in Table 2.

Comparative Synthesis Example 5

A fluorine-containing ethylenic polymer in powder form was obtained in the same manner as in Synthesis Example 1 except that the reaction product recovered after pressure release to atmospheric pressure, washed and dried was not subjected to extraction treatment with HCFC-141b.

The fluorine-containing ethylenic polymer obtained in powder form was pelletized using the same extruder as used in Comparative Synthesis Example 1 under the melt-kneading conditions and pellet heating conditions shown in Table 1 to give a fluorine-containing ethylenic polymer in pellet form. The results of analysis for the above-mentioned items are shown in Table 2.

TABLE 1

| | Melt-kneading conditions | | | | | | | | | | Pellet heating conditions | |
|---|---|---|---|---|---|---|---|---|---|---|---|---|
| | Cylinder temperature | | | | | | | | Number of screw | Reduced | | |
| | C1 °C. | C2 °C. | C3 °C. | C4 °C. | C5 °C. | C6 °C. | AD °C. | D °C. | revolutions (rpm) | pressure invent (kPa) | Temperature (°C.) | Time (hr) |
| Synthesis Example 1 | 150 | 210 | 220 | 220 | 220 | 230 | 230 | 230 | 100 | 66.5 | 130 | 48 |
| Synthesis Example 2 | 170 | 210 | 230 | 240 | 240 | 255 | 255 | 255 | 100 | 66.5 | 170 | 24 |
| Synthesis Example 3 | 230 | 265 | 280 | 280 | 285 | 285 | 285 | 290 | 100 | 66.5 | 200 | 15 |
| Synthesis Example 4 | 230 | 265 | 280 | 280 | 285 | 285 | 285 | 290 | 100 | 66.5 | 200 | 15 |
| Synthesis Example 5 | 230 | 265 | 280 | 280 | 285 | 285 | 285 | 290 | 100 | 66.5 | 200 | 15 |
| Synthesis Example 6 | 230 | 265 | 280 | 280 | 285 | 285 | 285 | 290 | 70 | 66.5 | 200 | 15 |
| Synthesis Example 7 | 230 | 280 | 310 | 310 | 310 | 320 | 320 | 320 | 100 | 66.5 | 200 | 15 |
| Synthesis Example 8 | 230 | 280 | 310 | 310 | 310 | 320 | 320 | 320 | 100 | 66.5 | 200 | 15 |
| Synthesis Example 9 | 230 | 265 | 280 | 280 | 285 | 285 | 285 | 290 | 100 | 66.5 | 200 | 24 |
| Synthesis Example 10 | 280 | 330 | 360 | 360 | 360 | 360 | 360 | 360 | 100 | 66.5 | 260 | 24 |
| Synthesis Example 11 | 130 | 210 | 220 | 220 | 220 | 230 | 230 | 230 | 100 | 66.5 | 100 | 48 |
| Comparative Synthesis Example 1 | 170 | 230 | 250 | 250 | — | — | 250 | 255 | 30 | — | 80 | 8 |
| Comparative Synthesis Example 2 | 170 | 230 | 250 | 250 | — | — | 250 | 255 | 30 | — | 80 | 8 |
| Comparative Synthesis Example 3 | 230 | 270 | 280 | 280 | — | — | 285 | 290 | 30 | — | 80 | 8 |
| Comparative Synthesis Example 4 | 130 | 210 | 220 | 230 | — | — | 230 | 230 | 30 | — | 80 | 8 |
| Comparative Synthesis Example 5 | 150 | 210 | 230 | 230 | — | — | 230 | 230 | 30 | — | 80 | 8 |

In Table 2, TFE stands for tetrafluoroethylene, Et for ethylene, VdF for vinylidene fluoride, HFP for hexafluoropropylene, HF-Pe for perfluoro(1,1,5-trihydro-1-pentene), PMVE for perfluoro(methyl vinyl ether), PPVE for perfluoro(propyl vinyl ether), and AH for $CH_2\!=\!CFCF_2OCF(CF_3)CF_2OCF(CF_3)CH_2OH$.

TABLE 2

| | Fluorine-containing cohesive ethylenic polymer | Monomer composition (mol %) | | | | | | | | Melting point °C. | Melt flow rate (MFR) g/10 min (measurement temperature) |
|---|---|---|---|---|---|---|---|---|---|---|---|
| | | TFE | Et | VDF | HFP | HF-Pe | PMVE | PPVE | AH | | |
| Synthesis Example 1 | F-A | 41.0 | 44.5 | — | 14.0 | 0.5 | — | — | — | 165 | 12 (230° C.) |
| Synthesis Example 2 | F-B | 47.0 | 43.0 | — | 9.5 | 0.5 | — | — | — | 198 | 17 (265° C.) |
| Synthesis Example 3 | F-C | 57.0 | 41.8 | — | — | 1.2 | — | — | — | 254 | 18 (297° C.) |
| Synthesis Example 4 | F-D | 90.7 | — | — | — | — | 9.3 | — | — | 248 | 29 (297° C.) |
| Synthesis Example 5 | F-E | 57.0 | 41.8 | — | — | 1.2 | — | — | — | 254 | 15 (297° C.) |
| Synthesis Example 6 | F-F | 90.7 | — | — | — | — | 9.3 | — | — | 248 | 15 (297° C.) |
| Synthesis Example 7 | F-G | 57.0 | 41.8 | — | — | 1.2 | — | — | — | 254 | 18 (297° C.) |
| Synthesis Example 8 | F-H | 56.8 | 42.0 | — | — | 1.2 | — | — | — | 258 | 16 (297° C.) |
| Synthesis Example 9 | F-I | 56.8 | 42.0 | — | — | 1.2 | — | — | — | 258 | 14 (297° C.) |
| Synthesis Example 10 | F-J | 97.5 | — | — | — | — | — | 1.8 | 0.7 | 290 | 21 (330° C.) |
| Synthesis Example 11 | F-K | 41.9 | — | 51.9 | 5.5 | — | — | — | 0.7 | 135 | 18 (230° C.) |
| Comparative Synthesis Example 1 | | 47.0 | 43.0 | — | 9.5 | 0.5 | — | — | — | 198 | 17 (265° C.) |
| Comparative Synthesis Example 2 | | 47.0 | 43.0 | — | 9.5 | 0.5 | — | — | — | 198 | 15 (265° C.) |
| Comparative Synthesis Example 3 | | 57.1 | 41.7 | — | — | 1.2 | — | — | — | 254 | 26 (297° C.) |
| Comparative Synthesis Example 4 | | 41.9 | — | 51.9 | 5.5 | — | — | — | 0.7 | 135 | 22 (230° C.) |
| Comparative Synthesis Example 5 | | 41.0 | 44.5 | — | 14.0 | 0.5 | — | — | — | 165 | 16 (230° C.) |

| | Extract content | Oligomer content (mass %) | | Carbonate group | Carboxyl group | Hydroxyl group | Amide group | —C(=O)F group |
|---|---|---|---|---|---|---|---|---|
| | mass % | MW ≦ 35,000 | MW ≦ 10,000 | Groups/1 × 10$^6$ main chain carbon atoms | | | | |
| Synthesis Example 1 | 0.62 | 0.14 | 0.013 | 180 | ND | ND | ND | 2 |
| Synthesis Example 2 | 0.51 | 0.13 | 0.010 | 230 | ND | ND | ND | 2 |
| Synthesis Example 3 | 0.23 | 0.09 | 0.008 | 75 | ND | ND | ND | 3 |
| Synthesis Example 4 | 2.2 | 0.15 | 0.015 | 230 | ND | ND | ND | 3 |
| Synthesis Example 5 | 0.09 | 0.05 | 0.004 | 65 | ND | ND | ND | 3 |
| Synthesis Example 6 | 1.9 | 0.12 | 0.009 | 192 | ND | ND | ND | 5 |
| Synthesis Example 7 | 0.18 | 0.07 | 0.005 | 10 | 23 | ND | ND | 2 |
| Synthesis Example 8 | 0.17 | 0.04 | 0.002 | 8 | ND | ND | 65 | ND |
| Synthesis Example 9 | 0.22 | 0.08 | 0.006 | 12 | 3 | ND | ND | 41 |
| Synthesis Example 10 | 0.21 | 0.14 | 0.012 | ND | ND | 202 | 12 | ND |
| Synthesis Example 11 | 0.82 | 0.21 | 0.013 | ND | ND | 212 | ND | ND |
| Comparative Synthesis Example 1 | 2.32 | 1.31 | 0.09 | 350 | ND | ND | ND | 2 |
| Comparative Synthesis Example 2 | 2.18 | 1.23 | 0.08 | ND | ND | ND | 62 | ND |
| Comparative Synthesis Example 3 | 1.26 | 0.98 | 0.07 | 88 | ND | ND | ND | 2 |
| Comparative Synthesis Example 4 | 3.46 | 1.53 | 0.10 | ND | ND | 207 | ND | ND |
| Comparative Synthesis Example 5 | 2.82 | 1.62 | 0.11 | 190 | ND | ND | ND | 3 |

In the table, ND stands for "Not Detected", and NT for "Not Testable".

The fluorine-containing cohesive ethylenic polymers of Synthesis Examples 1 to 10 obtained by extrusion using the extruder having a pressure reducing device-equipped vent mechanism all showed reduced oligomer contents as compared with the fluorine-containing ethylenic polymers of Comparative Synthesis Examples obtained by extrusion using the extruder having no vent mechanism. The fluorine-containing cohesive ethylenic polymer of Synthesis Example 5 obtained by extraction of oligomers with a solvent having affinity for the oligomers under heating in addition to the use of the extruder having the pressuring reducing device-equipped vent mechanism showed a still more reduced oligomer content as compared with the fluorine-containing cohesive ethylenic polymer of Synthesis Example 3 not subjected to extraction with such solvent.

Synthesis Example 12

Synthesis of a Polyamide (PA-A; Nylon 12)

An autoclave was charged with 20 kg of ω-laurolactam and 1 kg of distilled water and, after nitrogen substitution, the temperature was raised and, after arrival at 280° C., the system inside was maintained at that temperature and at 3.2 MPa for 5 hours, followed by gradual pressure release. During that period, after waiting for the ω-laurolactam to be dissolved in water and melted, stirring was carried out. And, after the return of the system to atmospheric pressure, 100 g of stearic acid was added, and the resulting mixture was further stirred at 260° C. for 5 hours in a nitrogen atmosphere and then discharged and cooled with water. The product was processed in a pelletizer to give white pellets (polyamide PA-A). Upon analysis, it was found that the pellets had a melting point of 178° C., an acid value of 28 equivalents/$10^6$ g, an amine value of 6.8 equivalents/106 g and a relative viscosity of 3.0.

Synthesis Example 13

Synthesis of a Polyamide (PA-B; Nylon 11)

An autoclave was charged with 20 kg of 11-aminoundecanoic acid, 5 kg of distilled water and 100 g of a 30% aqueous solution of phosphoric acid and, after nitrogen substitution, the temperature was raised in a tightly closed condition, and the mixture was maintained at 120° C. for 2 hours. Then, the temperature was further raised and the system inside was maintained at 220° C. and 0.4 MPa for 2 hours, followed by gradual pressure release. During that period, after waiting for the 11-aminoundecanoic acid to be dissolved in water and melted, stirring was carried out. And, after the return of the system to atmospheric pressure, 110 g of stearic acid was added, and the resulting mixture was further stirred at 265° C. for 4 hours in a nitrogen atmosphere and then discharged and cooled with water. The product was processed in a pelletizer to give white pellets (polyamide PA-B). The analytical results are shown in Table 3.

Synthesis Example 14

Synthesis of a Polyamide (PA-C; Nylon 6)

An autoclave was charged with 20 kg of ε-caprolactam and 2 kg of distilled water and, after nitrogen substitution, the temperature was raised and, while maintaining the temperature at 120° C. and after waiting for the ε-caprolactam to be dissolved in water and melted, stirring was started. The temperature was then further raised to 220° C., and the system inside was maintained at that temperature and at 0.4 MPa for 5 hours. Then, the temperature was raised to 250° C. while gradual pressure release. And, after the return of the system to atmospheric pressure, 75 g of benzoic acid was added, and the resulting mixture was further stirred at that temperature for 3 hours in a nitrogen atmosphere and then discharged and cooled with water. The product was processed in a pelletizer to give white pellets. The pellets were then immersed in distilled water at 80° C. for 12 hours to extract low-molecular-weight components, including the monomer. The pellets were then thoroughly dried to give a polyamide, PA-C. The results of analysis of the dried pellets (polyamide PA-C) are shown in Table 3.

Synthesis Example 15

Synthesis of a Polyamide (PA-D; Nylon 6)

An autoclave was charged with 20 kg of ε-caprolactam and 2 kg of distilled water and, after nitrogen substitution, the temperature was raised and, while maintaining the temperature at 120° C. and after waiting for the ε-caprolactam to be dissolved in water and melted, stirring was started. The temperature was then further raised to 220° C., and the system inside was maintained at that temperature and at 0.3 MPa for 5 hours. Then, the temperature was raised to 260° C. while gradual pressure release. And, after the return of the system to atmospheric pressure, 48 g of benzoic acid was added, and the resulting mixture was further stirred at that temperature for 5 hours in a nitrogen atmosphere and then discharged and cooled with water. The product was processed in a pelletizer to give white pellets. The pellets were then immersed in distilled water at 80° C. for 12 hours to extract low-molecular-weight components, including the monomer. The pellets were then thoroughly dried to give a polyamide, PA-D. The results of analysis of the dried pellets (polyamide PA-D) are shown in Table 3.

TABLE 3

| | Polyamide | Amine value (Equivalent/$10^6$ g) | Acid value (Equivalent/$10^6$ g) | Melting point (° C.) | Relative viscosity |
|---|---|---|---|---|---|
| Synthesis Example 12 | PA-A | 6.8 | 28 | 178 | 3.0 |
| Synthesis Example 13 | PA-B | 8.4 | 33 | 186 | 2.9 |
| Synthesis Example 14 | PA-C | 7.2 | 62 | 224 | 2.6 |
| Synthesis Example 15 | PA-D | 7.1 | 40 | 224 | 3.4 |

Example 1

The fluorine-containing cohesive ethylenic polymer (F-A) was molded into a film using a ø 30 mm single-screw extruder equipped with a T die to give a film with a width of 15 cm and a thickness of 200 μm. This film was measured for stress cracking resistance in the CM15 mixture by the method mentioned above. The molding conditions and evaluation result are shown in Table 4.

Examples 2 to 11 and Comparative Examples 1 to 3

The fluorine-containing cohesive ethylenic polymers (F-B) to (F-K) and the fluorine-containing ethylenic polymers obtained in Comparative Synthesis Examples 1 to 3 were respectively used in lieu of the fluorine-containing cohesive ethylenic polymer (F-A) and molded into films in the same manner as in Example 1 except that the molding conditions specified in Table 4 were used, and the films were measured for stress cracking resistance. The molding conditions and evaluation results are shown in Table 4.

TABLE 4

|  | Fluorine-containing cohesive ethylenic polymer | Film molding conditions | | | | | | | Stress cracking resistance % |
|---|---|---|---|---|---|---|---|---|---|
|  |  | Cylinder temperature | | | | Roll temperature °C. | Take-off speed m/min | Film thickness μm |  |
|  |  | C1 °C. | C2 °C. | C3 °C. | AD °C. | D °C. |  |  |  |
| Example 1 | F-A | 155 | 220 | 230 | 240 | 240 | 100 | 1 | 200 | 18 |
| Example 2 | F-B | 190 | 230 | 250 | 260 | 260 | 120 | 1 | 200 | 16 |
| Example 3 | F-C | 250 | 295 | 290 | 300 | 295 | 150 | 1 | 200 | 20 |
| Example 4 | F-D | 250 | 295 | 295 | 300 | 295 | 150 | 1 | 200 | 26 |
| Example 5 | F-E | 250 | 295 | 295 | 300 | 295 | 150 | 1 | 200 | 20 |
| Example 6 | F-F | 250 | 295 | 295 | 300 | 295 | 150 | 1 | 200 | 18 |
| Example 7 | F-G | 250 | 295 | 295 | 300 | 295 | 150 | 1 | 200 | 20 |
| Example 8 | F-H | 250 | 295 | 295 | 300 | 295 | 150 | 1 | 200 | 20 |
| Example 9 | F-I | 250 | 295 | 295 | 300 | 295 | 150 | 1 | 200 | 20 |
| Example 10 | F-J | 280 | 330 | 340 | 340 | 340 | 150 | 1 | 200 | 24 |
| Example 11 | F-K | 155 | 220 | 230 | 240 | 240 | 100 | 1 | 200 | 23 |
| Comparative Example 1 |  | 190 | 230 | 250 | 260 | 260 | 150 | 1 | 200 | 6 |
| Comparative Example 2 |  | 190 | 230 | 250 | 260 | 260 | 150 | 1 | 200 | 6 |
| Comparative Example 3 |  | 250 | 295 | 295 | 300 | 295 | 150 | 1 | 200 | 8 |

The films of Examples 1 to 11 each comprising a fluorine-containing cohesive ethylenic polymer layer were all excellent in stress cracking resistance as compared with the films of Comparative Examples 1 to 3 each having a fluorine-containing ethylenic polymer layer higher in oligomer content.

Example 12

Using a two-material/two-layer tube extrusion apparatus (product of Pla Giken Co., Ltd.) equipped with a multi-manifold die, a tube having an outside diameter of 8.2 mm and an inside diameter of 6 mm was continuously molded by feeding the polyamide PA-A and the fluorine-containing cohesive ethylenic polymer (F-A) to the outer layer and inner layer extruders, respectively, so that the polyamide PA-A layer might constitute the tube outer layer and the fluorine-containing cohesive ethylenic polymer (F-A) layer might form the inner layer. This tube was measured for interlaminar bond strength by the method mentioned above. The molding conditions and evaluation result are shown in Table 5.

Examples 13 to 22 and Comparative Examples 4 to 6

Using the fluorine-containing cohesive ethylenic polymers or fluorine-containing ethylenic polymers and polyamides specified in Table 5, two-material/two-layer tubes were molded in the same manner as in Example 12 except that the molding conditions shown in Table 5 were used. The tubes were measured for interlaminar bond strength. The molding conditions and evaluation results are shown in Table 5. The two-material, two-layer tube of Example 17 showed a surface resistance value of 105 Ω·cm/cm as measured by the above-mentioned method of surface resistance value determination.

TABLE 5

|  | Two-layer tube molding conditions | | | | | | | | |
|---|---|---|---|---|---|---|---|---|---|
|  | Inner layer Outer layer | Cylinder temperature | | | | Die temperature | Take-off speed | Layer thickness | Interlaminar bond strength N/cm |
|  |  | C1 °C. | C2 °C. | C3 °C. | AD °C. | D °C. | m/min | Inner layer/outer layer μm |  |
| Example 12 | F-A | 180 | 230 | 260 | 260 | 280 | 8 | 250/850 | 49 |
|  | PA-A | 210 | 230 | 240 | 245 |  |  |  |  |
| Example 13 | F-B | 230 | 260 | 260 | 270 | 280 | 8 | 250/850 | 51 |
|  | PA-A | 210 | 230 | 240 | 245 |  |  |  |  |
| Example 14 | F-C | 280 | 280 | 285 | 290 | 290 | 8 | 250/850 | 47 |
|  | PA-A | 210 | 230 | 240 | 245 |  |  |  |  |
| Example 15 | F-D | 285 | 285 | 285 | 290 | 290 | 8 | 250/850 | 46 |
|  | PA-A | 210 | 230 | 240 | 245 |  |  |  |  |
| Example 16 | F-E | 280 | 280 | 285 | 290 | 290 | 8 | 250/850 | 52 |
|  | PA-A | 210 | 230 | 240 | 245 |  |  |  |  |
| Example 17 | F-F | 280 | 280 | 285 | 290 | 290 | 8 | 250/850 | 45 |
|  | PA-A | 210 | 230 | 240 | 245 |  |  |  |  |
| Example 18 | F-G | 280 | 280 | 300 | 310 | 300 | 8 | 250/850 | 51 |
|  | PA-A | 210 | 230 | 240 | 245 |  |  |  |  |
| Example 19 | F-H | 280 | 280 | 300 | 310 | 300 | 8 | 250/850 | 52 |
|  | PA-A | 210 | 230 | 240 | 245 |  |  |  |  |
| Example 20 | F-I | 280 | 280 | 285 | 290 | 290 | 8 | 250/850 | 39 |
|  | PA-A | 210 | 230 | 240 | 245 |  |  |  |  |
| Example 21 | F-C | 280 | 280 | 285 | 290 | 290 | 8 | 250/850 | 48 |
|  | PA-B | 210 | 230 | 240 | 245 |  |  |  |  |

TABLE 5-continued

| | | Two-layer tube molding conditions | | | | | | | |
|---|---|---|---|---|---|---|---|---|---|
| | | Cylinder temperature | | | | Die temperature | Take-off speed | Layer thickness | Interlaminar bond strength |
| | Inner layer Outer layer | C1 °C. | C2 °C. | C3 °C. | AD °C. | D °C. | m/min | Inner layer/outer layer μm | N/cm |
| Example 22 | F-C | 280 | 280 | 285 | 290 | 290 | 8 | 250/850 | 44 |
| | PA-C | 210 | 260 | 260 | 265 | | | | |
| Comparative Example 4 | Comparative Synthesis Example 1 | 230 | 260 | 260 | 270 | 280 | 8 | 250/850 | 16 |
| | PA-A | 210 | 230 | 240 | 245 | | | | |
| Comparative Example 5 | Comparative Synthesis Example 2 | 230 | 260 | 260 | 270 | 280 | 8 | 250/850 | Spontaneous peeling |
| | PA-A | 210 | 230 | 240 | 245 | | | | |
| Comparative Example 6 | Comparative Synthesis Example 3 | 280 | 280 | 285 | 290 | 290 | 8 | 250/850 | 14 |
| | PA-A | 210 | 230 | 240 | 245 | | | | |

The tubes of Examples 12 to 22 each comprising a fluorine-containing cohesive ethylenic polymer were all excellent in interlaminar bond strength as compared with the tubes of Comparative Examples 4 to 6 each comprising a fluorine-containing ethylenic polymer higher in oligomer content.

Example 23

Using a two-material, two-layer tube extrusion apparatus (product of Research Laboratory of Plastics Technology Co., Ltd.) equipped with a multi-manifold T die, a two-material/two-layer type multi-layer film having a total thickness of 1.5 mm and a width of 200 mm was molded by feeding the polyamide PA-A and the fluorine-containing cohesive ethylenic polymer (F-A) to two extruders, respectively. This film was measured for interlaminar bond strength by the method mentioned above. The molding conditions and evaluation result are shown in Table 6.

Examples 24 and 25 and Comparative Examples 7 and 8

Two-material/two-layer type multi-layer films were molded in the same manner as in Example 23 except that the fluorine-containing cohesive ethylenic polymers or fluorine-containing ethylenic polymers and polyamides specified in Table 6 were used. The molding conditions and evaluation results are shown in Table 6.

Example 26

Using a three-material/three-layer tube extrusion apparatus (product of Research Laboratory of Plastics Technology Co., Ltd.) equipped with a multi-manifold T die, a three-material/three-layer type multi-layer film having a total thickness of 1.5 mm and a width of 200 mm was molded by feeding the fluorine-containing cohesive ethylenic polymer (F-K), a maleic anhydride-modified polyolefin (trademark: Admer NF528; melting point 120° C., melt flow rate [MFR] 2.2 g/10 min; product of Mitsui Chemical) and a high-density polyethylene species (trademark: Hizex 3300F; melting point 131° C., MFR 1.1 g/10 min; product of Sumitomo-Mitsui Polyolefin) to three extruders, respectively, so that the maleic anhydride-modified polyolefin might constitute the intermediate layer. For this film, the interlaminar bond strength between the fluorine-containing cohesive ethylenic polymer layer and maleic anhydride-modified polyolefin layer was measured by the method mentioned above. The molding conditions and evaluation result are shown in Table 6.

Comparative Example 9

A three material/three layer type multilayer film was molded in the same manner as in Example 26 except that the fluorine-containing ethylenic polymer obtained in Comparative Synthesis Example 4 was used in lieu of the fluorine-containing cohesive ethylenic polymer (F-K). For this film, the interlaminar bond strength between the fluorine-containing ethylenic polymer layer and maleic anhydride-modified polyolefin layer was measured by the method mentioned above. The molding conditions and evaluation result are shown in Table 6.

TABLE 6

| | | Film molding conditions | | | | | | | | |
|---|---|---|---|---|---|---|---|---|---|---|
| | Inner layer (Intermediate layer) Outer layer | Cylinder temperature | | | | Die temperature | Roll temperature | Roll speed | Layer thickness | Interlaminar bond strength |
| | | C1 °C. | C2 °C. | C3 °C. | AD °C. | D °C. | °C. | m/min | μm | N/cm |
| Example 23 | F-C | 280 | 280 | 285 | 290 | 290 | 100 | 1.2 | 550 | 45 |
| | PA-A | 210 | 230 | 240 | 245 | | | | 950 | |
| Example 24 | F-G | 280 | 280 | 300 | 310 | 300 | 100 | 1.2 | 550 | 47 |
| | PA-B | 210 | 230 | 240 | 245 | | | | 950 | |

TABLE 6-continued

| | Inner layer (Intermediate layer) Outer layer | Film molding conditions | | | | | | | | Interlaminar bond strength N/cm |
|---|---|---|---|---|---|---|---|---|---|---|
| | | Cylinder temperature | | | | Die temperature | Roll temperature | Roll speed | Layer thickness | |
| | | C1 °C. | C2 °C. | C3 °C. | AD °C. | D °C. | °C. | m/min | μm | |
| Example 25 | F-H | 280 | 280 | 300 | 310 | 300 | 100 | 1.2 | 550 | 44 |
| | PA-C | 210 | 260 | 260 | 265 | | | | 950 | |
| Comparative Example 7 | Comparative Synthesis Example 1 | 230 | 260 | 260 | 270 | 280 | 100 | 1.2 | 550 | 12 |
| | PA-A | 210 | 230 | 240 | 245 | | | | 950 | |
| Comparative Example 8 | Comparative Synthesis Example 2 | 230 | 260 | 260 | 270 | 280 | 100 | 1.2 | 550 | Spontaneous peeling |
| | PA-A | 210 | 230 | 240 | 245 | | | | 950 | |
| Example 26 | F-K | 170 | 220 | 240 | 240 | 240 | 80 | 1.5 | 550 | 38 |
| | AdmerNF528 | 200 | 210 | 200 | 220 | | | | 50 | |
| | Hizex3300F | 190 | 225 | 225 | 230 | | | | 900 | |
| Comparative Example 9 | Comparative Synthesis Example 4 | 170 | 220 | 240 | 240 | 240 | 80 | 1.5 | 550 | 14 |
| | AdmerNF528 | 200 | 210 | 200 | 220 | | | | 50 | |
| | Hizex3300F | 190 | 225 | 225 | 230 | | | | 900 | |

Example 27

Using a four-material/four-layer tube extrusion apparatus (product of Pla Giken Co., Ltd.) equipped with a multi-manifold die, a four material/four layer tube having an outside diameter of 8.2 mm and an inside diameter of 6 mm was continuously molded by feeding the fluorine-containing cohesive ethylenic polymer (F-A) obtained in Synthesis Example 1, an ethylene/vinyl alcohol resin (trademark: Eval F101A; melting point 183° C., MFR 1.3 g/10 min; product of Kuraray Co., Ltd.), a maleic acid-modified polyethylene resin (trademark: Admer NF528, melting point 120° C., MFR 2.2 g/10 min; product of Mitsui Chemical) and a high-density polyethylene species (trademark: Novatec HD HJ340; melting point 131° C., MFR 5.0 g/10 min; product of Japan Polychem Corporation) to four extruders, respectively, so that the materials might constitute the innermost layer to outermost layer in that order. For the tube obtained, the interlaminar bond strength between the fluorine-containing cohesive ethylenic polymer layer and ethylene/vinyl alcohol resin layer was measured by the method mentioned above. The molding conditions and evaluation result are shown in Table 7.

Comparative Example 10

A four material/four layer tube was molded by proceeding in the same manner as Example 27 except that the fluorine-containing ethylenic polymer obtained in Comparative Synthesis Example 5 was used as the innermost layer in lieu of the fluorine-containing cohesive ethylenic polymer (F-A) obtained in Synthesis Example 1. For the tube obtained, the interlaminar bond strength between the fluorine-containing ethylenic polymer layer and ethylene/vinyl alcohol resin layer was measured by the method mentioned above. The molding conditions and evaluation result are shown in Table 7.

TABLE 7

| | Innermost layer Inner layer Outer layer Outermost layer | Four-layer tube molding conditions | | | | | | | |
|---|---|---|---|---|---|---|---|---|---|
| | | Cylinder temperature | | | | Die temperature | Take-off speed | Layer thickness | Interlaminar bond strength |
| | | C1 °C. | C2 °C. | C3 °C. | AD °C. | D °C. | m/min | μm | N/cm |
| Example 27 | F-A | 180 | 230 | 260 | 260 | 240 | 8 | 280 | 42 |
| | EvalF101A | 145 | 200 | 200 | 200 | | | 80 | |
| | AdmerNF528 | 200 | 210 | 200 | 220 | | | 80 | |
| | NovatecHDHJ340 | 195 | 225 | 225 | 230 | | | 660 | |
| Comparative Example 10 | Comparative Synthesis Example 5 | 180 | 230 | 260 | 260 | 240 | 8 | 280 | 16 |
| | EvalF101A | 145 | 200 | 200 | 200 | | | 80 | |
| | AdmerNF528 | 200 | 210 | 200 | 220 | | | 80 | |
| | NovatecHDHJ340 | 195 | 225 | 225 | 230 | | | 660 | |

Example 28

Using a corrugated hose mold in a blow molding machine (product of The Japan Steel Works, Ltd.) equipped with a two-material/two-layer type multi-layer die, a two material/two layer corrugated hose having an outside diameter of 30 mm and an inside diameter of 28 mm was molded by feeding the polyamide PA-D and fluorine-containing cohesive ethylenic polymer (F-B) to the outer layer and inner layer extruders, respectively, so that the polyamide PA-D obtained in Synthesis Example 15 and fluorine-containing cohesive ethylenic polymer (F-B) obtained in Synthesis Example 2 might constitute the outer layer and inner layer of the corrugated hose, respectively. The molding conditions and interlaminar bond strength evaluation result are shown in Table 8.

Comparative Example 11

A two material/two layer corrugated hose was molded by proceeding in the same manner as in Example 28 except that the fluorine-containing ethylenic polymer obtained in Comparative Synthesis Example 1 was used in lieu of the fluorine-containing cohesive ethylenic polymer (F-B) obtained in Synthesis Example 2. The molding conditions and evaluation result are shown in Table 8.

INDUSTRIAL APPLICABILITY

The present invention, which has the above-described constitution, can provide fluoropolymers capable of giving fluorine-containing molded materials, laminates and fluorine-containing fabricated articles excellent in chemical resistance, oil resistance, low liquid chemical permeability and heat resistance, among others, and further excellent in stress cracking resistance and interlaminar bond strength.

The invention claimed is:

1. A method of producing a laminate containing a fluoropolymer comprising the step of removing oligomers by extruding the fluorine-containing ethylenic polymer obtained by polymerization using an extruder having a vent mechanism equipped with a pressure reducing device,
    said fluoropolymer being an oligomer-containing or oligomer-free fluoropolymer, and
    being a copolymer comprising tetrafluoroethylene unit and a perfluoro monomer unit derived from a perfluoro monomer represented by the general formula (i):

$$CF_2=CF-Rf^1 \qquad (i)$$

TABLE 8

| | | Two-layer corrugated hose molding conditions | | | | | |
|---|---|---|---|---|---|---|---|
| | | Cylinder temperature | | | | Die temperature | Layer thickness | Interlaminar bond strength |
| | Inner layer | C1 | C2 | C3 | AD | D | | |
| | Outer layer | °C. | °C. | °C. | °C. | °C. | μm | N/cm |
| Example 28 | F-B | 230 | 260 | 270 | 270 | 275 | 250 | 43 |
| | PA-D | 210 | 250 | 260 | 265 | | 750 | |
| Comparative Example 11 | Comparative Synthesis Example 1 | 230 | 260 | 270 | 270 | 275 | 250 | 14 |
| | PA-D | 210 | 250 | 260 | 265 | | 750 | |

As is evident from Tables 5 to 8, the films, tubes and corrugated hose having a fluorine-containing cohesive ethylenic polymer layer were respectively superior in the interlaminar bond strength between the fluorine-containing cohesive ethylenic polymer layer and the other layer in contact with the fluorine-containing cohesive ethylenic layer. On the contrary, the films, four material/four layer tube and two material/two layer corrugated hose of the comparative examples each having a layer of a fluorine-containing ethylenic polymer high in oligomer content were inferior in the interlaminar bond strength between the fluorine-containing ethylenic polymer layer and the layer in contact with the fluorine-containing ethylenic polymer layer.

wherein $Rf^1$ represents $-CF_3$ or $-ORf^2$, and $Rf^2$ represents a perfluoroalkyl group containing 1 to 5 carbon atoms, and
    wherein the content of oligomers having a number average molecular weight of not higher than 10,000 is not higher than 0.05% by mass relative to the mass of said fluoropolymer.

2. The method of producing a laminate according to claim 1,
    wherein the fluoropolymer is a fluorine-containing cohesive ethylenic polymer.

* * * * *